(12) United States Patent
Pionetti et al.

(10) Patent No.: US 9,377,133 B2
(45) Date of Patent: Jun. 28, 2016

(54) CURVATURE LIMITER FOR A FLEXIBLE UNDERSEA LINE, AND SEABED-TO-SURFACE LINKING EQUIPMENT INCLUDING SAME

(75) Inventors: François-Régis Pionetti, La Baleine (FR); Xavier Rocher, Chatou (FR)

(73) Assignee: Saipem S.A., Montigny le Bretonneux (FR)

( * ) Notice: Subject to any disclaimer, the term of this patent is extended or adjusted under 35 U.S.C. 154(b) by 144 days.

(21) Appl. No.: 13/983,347

(22) PCT Filed: Jan. 23, 2012

(86) PCT No.: PCT/FR2012/050137
§ 371 (c)(1),
(2), (4) Date: Aug. 2, 2013

(87) PCT Pub. No.: WO2012/104518
PCT Pub. Date: Aug. 9, 2012

(65) Prior Publication Data
US 2013/0315673 A1   Nov. 28, 2013

(30) Foreign Application Priority Data
Feb. 3, 2011  (FR) ..................... 11 50849

(51) Int. Cl.
*E21B 17/01*  (2006.01)
*F16L 3/12*   (2006.01)
*F16L 1/12*   (2006.01)
*F16L 1/20*   (2006.01)
(Continued)

(52) U.S. Cl.
CPC ............ *F16L 3/1218* (2013.01); *E21B 17/015* (2013.01); *E21B 17/017* (2013.01); *F16L 1/123* (2013.01); *F16L 1/20* (2013.01); *F16L 57/02* (2013.01); *H02G 3/0475* (2013.01); *H02G 9/02* (2013.01)

(58) Field of Classification Search
USPC ............................ 405/158; 166/367; 138/106
See application file for complete search history.

(56) References Cited

U.S. PATENT DOCUMENTS 2,177,128 A * 10/1939 Axel ....................... F16G 13/16
                                                            138/110
3,420,331 A    1/1969 Minnite
(Continued)

FOREIGN PATENT DOCUMENTS

FR    2 889 557    2/2007
FR    2 952 671    5/2011
(Continued)

*Primary Examiner* — Benjamin Fiorello
*Assistant Examiner* — Kyle Armstrong
(74) *Attorney, Agent, or Firm* — Cozen O'Connor

(57) ABSTRACT

The present invention relates to a curvature limiter device constituted by fastening tubular sleeves (5) end-to-end, the tubular sleeves being fitted at their longitudinal ends with fastener-and-hinge devices (6) on their top faces and with bottom abutments ($7_1$, $7_2$) diametrically opposite on their bottom faces. The present invention also provides a bottom-to-surface connection installation between undersea equipment such as an undersea well head or the end of an undersea pipe resting on the sea bottom (16) and a floating support (12) on the surface, the installation comprising an undersea flexible line (2) having its curvature controlled by a said curvature limiter device (1) of the invention, said curvature limiter device being arranged at an intermediate depth between the sea bottom (16) and the surface (17).

17 Claims, 10 Drawing Sheets

(51) Int. Cl.
*F16L 57/02* (2006.01)
*H02G 3/04* (2006.01)
*H02G 9/02* (2006.01)

(56) References Cited

U.S. PATENT DOCUMENTS

| | | | |
|---|---|---|---|
| 3,955,599 A * | 5/1976 | Walker | 138/103 |
| 4,474,129 A * | 10/1984 | Watkins et al. | 114/243 |
| 4,703,135 A * | 10/1987 | Magnani et al. | 174/135 |
| 6,276,456 B1 * | 8/2001 | Head | 166/359 |
| 6,623,209 B1 * | 9/2003 | Waters, Jr. | E02B 3/104 |
| | | | 405/100 |
| 7,396,797 B2 * | 7/2008 | Tsutsumi et al. | 502/185 |
| 2008/0196899 A1 * | 8/2008 | Alliot | 166/350 |
| 2010/0228295 A1 | 9/2010 | Whitefield | |

FOREIGN PATENT DOCUMENTS

| | | |
|---|---|---|
| GB | 2 334 048 | 8/1999 |
| JP | 2009-060731 | 3/2009 |
| WO | WO 00/49267 | 8/2000 |
| WO | WO 2009/138609 | 11/2009 |

* cited by examiner

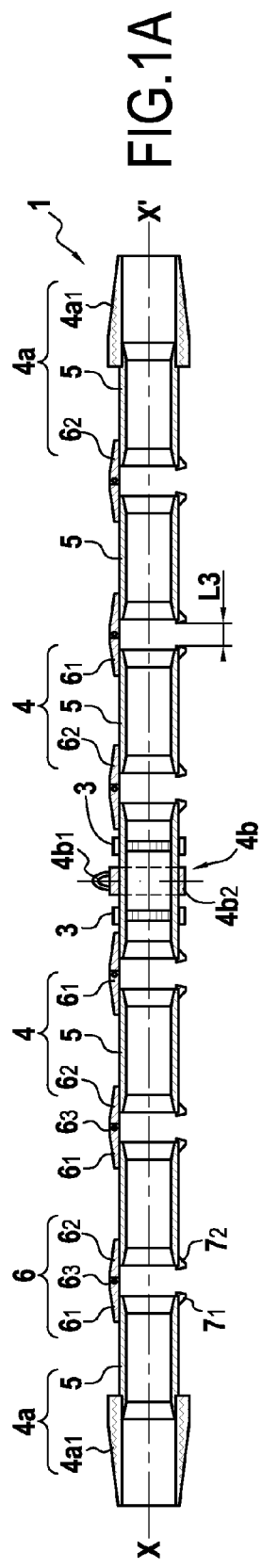
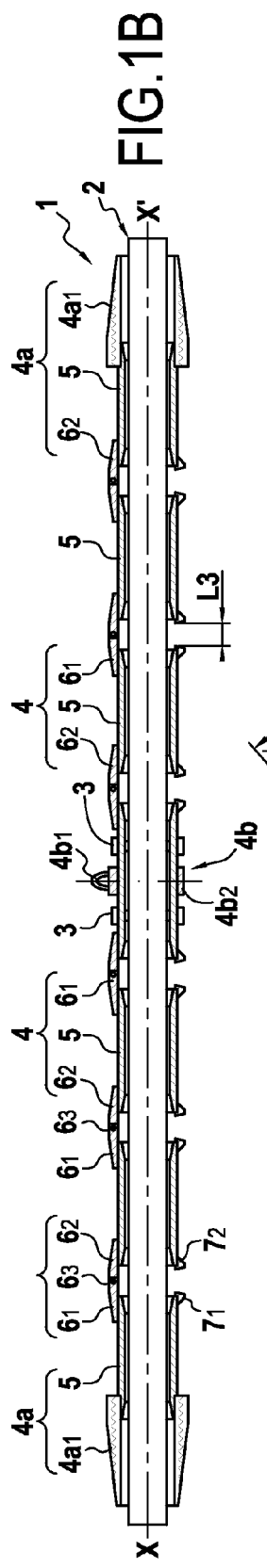
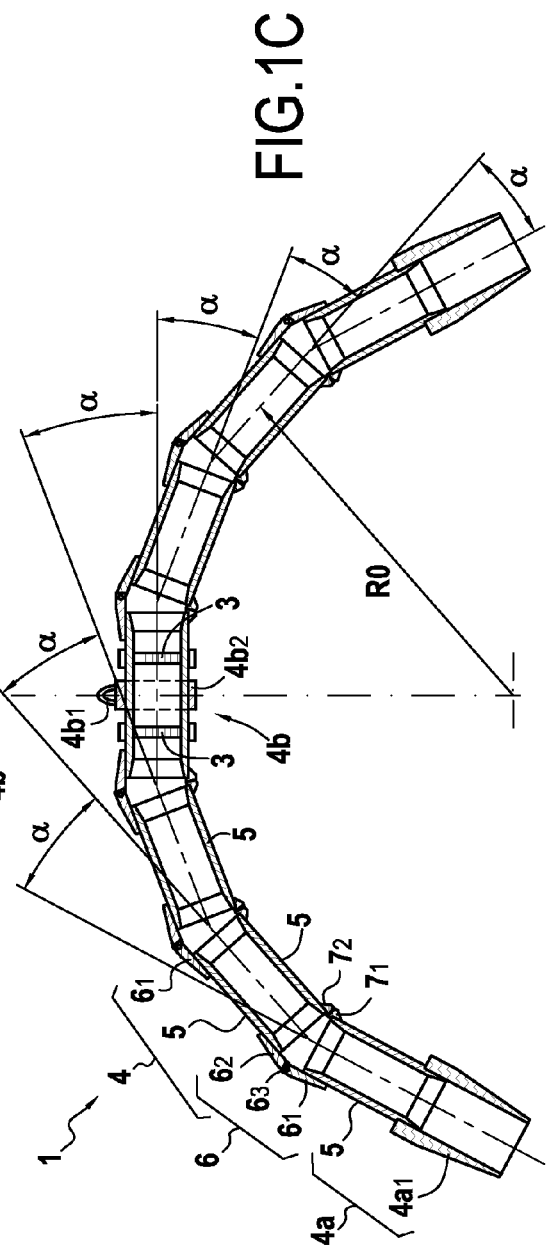

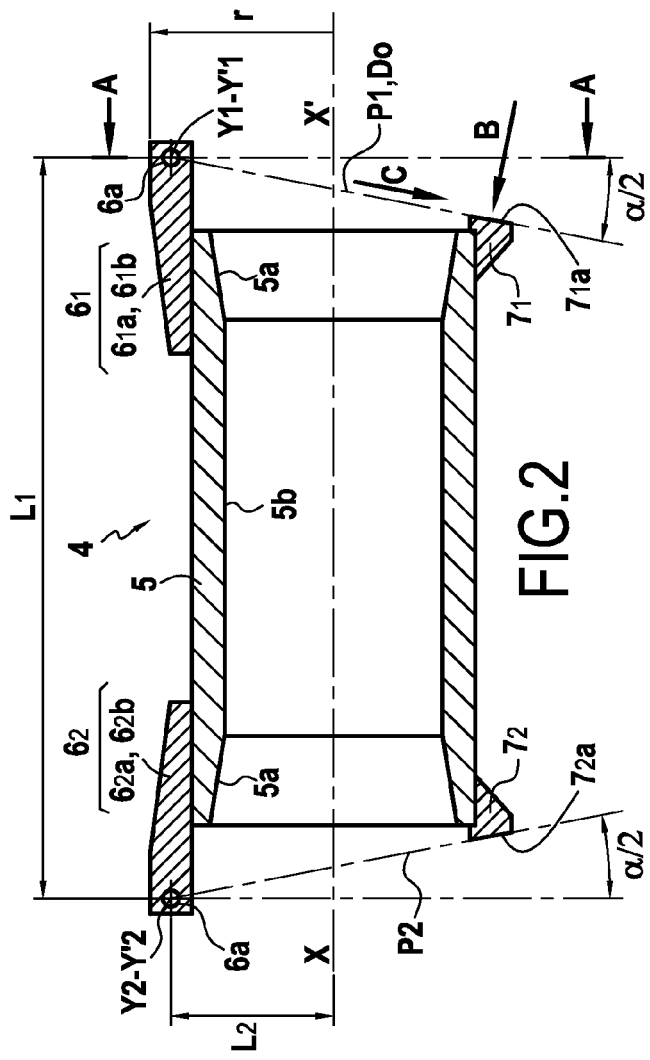
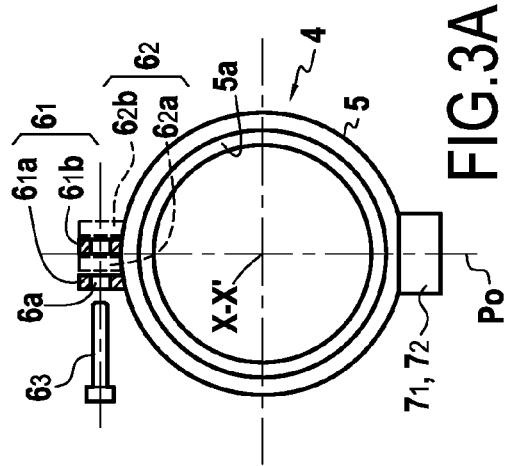
FIG.3A
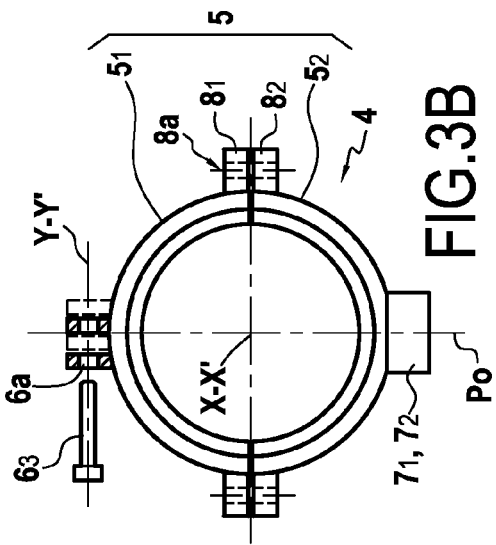
FIG.3B
FIG.2
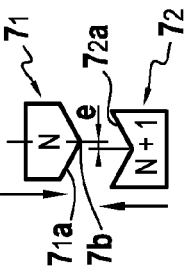
FIG.4C
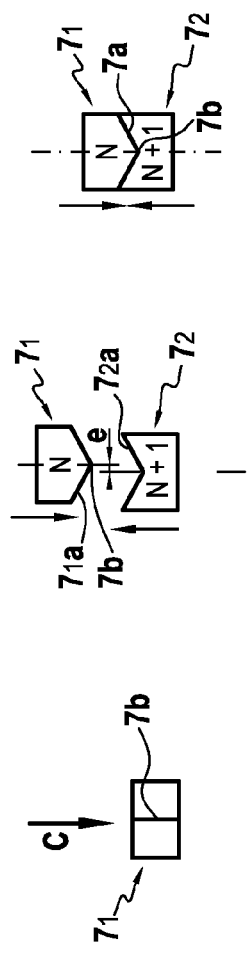
FIG.4B
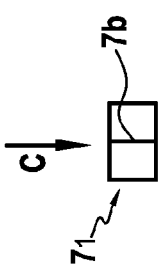
FIG.4A

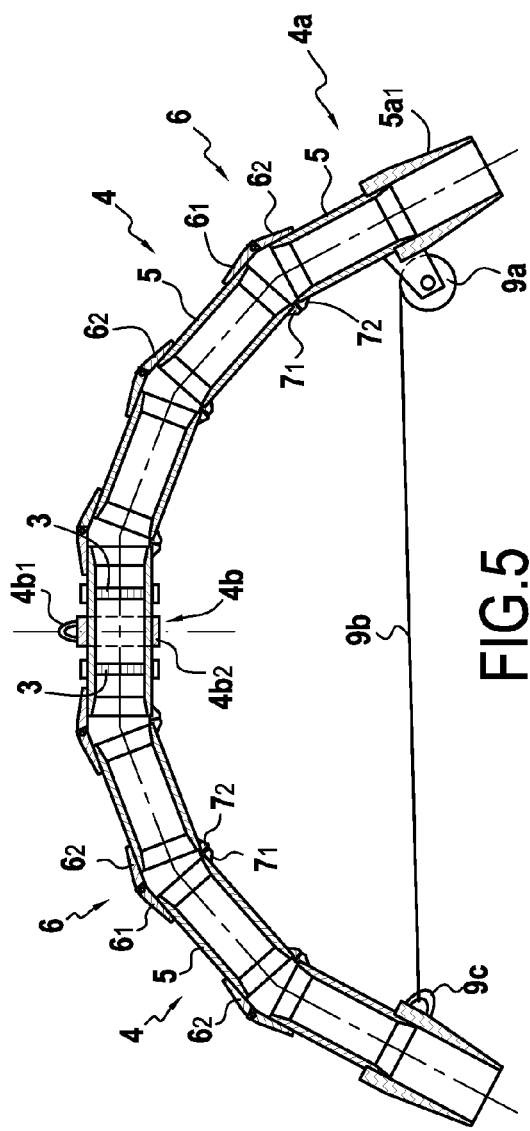
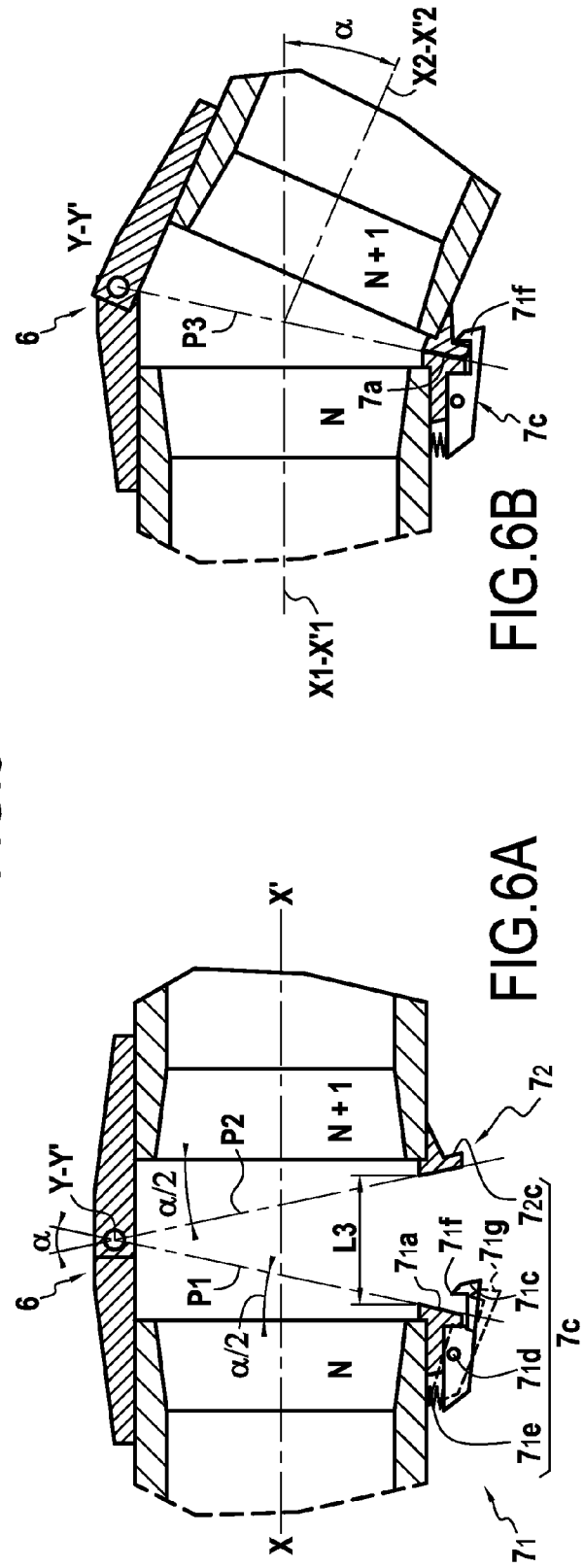
FIG.5
FIG.6A
FIG.6B

US 9,377,133 B2

CURVATURE LIMITER FOR A FLEXIBLE UNDERSEA LINE, AND SEABED-TO-SURFACE LINKING EQUIPMENT INCLUDING SAME

PRIORITY CLAIM

This is a U.S. national stage of application No. PCT/FR2012/050137 filed on Jan. 23, 2012. Priority is claimed on France, Application No. FR1150849 filed Feb. 3, 2011, the content of which is incorporated herein by reference.

BACKGROUND OF THE INVENTION

1. Field of the Invention

The present invention relates to a curvature limiter device forming a tubular member suitable for adopting a rectilinear position or a position of variable curvature while preventing a radius of curvature that is less than a given minimum radius of curvature $R_0$, and thus allowing controlled variable curvature or no curvature in a flexible line that is threaded inside said tubular member.

The present invention also relates to a bottom-to-surface connection installation between a) undersea equipment, such as an undersea well head or the end of an undersea pipe resting on the sea bottom, and b) a floating support on the surface, the installation including an undersea flexible line of curvature that is locally controlled by a curvature limiter.

More particularly, the invention relates to an installation comprising a hybrid tower made up of a flexible pipe connected to a rigid riser column or vertical riser, having its bottom end connected to the top end of a said piece of equipment or to a said end of an undersea pipe resting on the sea bottom, said tower being coupled to at least one said flexible line passing through a curvature limiter attached to said riser column and/or in suspension attached to a subsurface float.

2. Detail Description of the Prior Art

The term undersea flexible line is used herein to mean a line that is easy to curve in order to obtain a minimum radius of curvature of a few meters, and in particular in the range 0.5 meters (m) to 5 m while remaining in the elastic range, as contrasted to a rigid steel pipe having a solid wall and for which the radius of curvature in the elastic domain is several tens or even hundreds of meters. By way of example, such flexible lines may be:

a) a flexible pipe for transferring a petroleum fluid, such as the hoses fabricated by Coflexip (France) and used in particular in the above-mentioned hybrid towers, conventionally being constituted by an internal tube of flexible polymer material reinforced by braided composite or metal wire reinforcement forming spiral-wound sheaths, and where appropriate a plurality of intermediate tubes or outer tubes between layers of said reinforcement;

b) pipes or cables for transferring energy or information such as electric cables, control cables, hydraulic fluid transfer pipes feeding hydraulic equipment such as actuators, or pipes containing optical fibers; or indeed c) umbilicals, i.e. pipes made up of a plurality of such electric cables, hydraulic pipes, control cables, and/or optical fibers.

The technical field of the invention is more particularly the field of fabricating and installing production riser columns (or "risers") for conveying oil, or gas, or any other soluble or meltable material, or a suspension of mineral materials, from an underwater well head to a floating support in order to develop production fields installed off-shore, out at sea. The main and immediate application of the invention lies in the field of oil production.

In general, a floating support has anchor means to keep it in position in spite of the effects of currents, winds, and swell. It also generally includes means for storing and processing oil together with off-loading means for off-loading oil to tankers that call at regular intervals in order to remove the production. The common term for such supports is floating production storage and off-loading supports, and they are referred to throughout the description below by the initials FPSO.

Hybrid tower type bottom-to-surface connections for an undersea pipe resting on the sea bed are known and they comprise:

a substantially vertical steel riser having its bottom end anchored to the sea bottom and connected to a said pipe resting on the sea bottom; and a connection pipe, generally a flexible connection pipe in continuity of curvature as a dipping catenary between the top end of said riser and a floating support on the surface, said flexible connection pipe possibly including buoyancy elements along a fraction of its length. The term "dipping catenary" is used herein to mean a curve having the geometrical shape known as a "catenary" with a bottom point of inflection.

Connections of this type are described more particularly in patent WO 2009/138609. Patent WO 00/49267 in the name of the Applicant describes a variant hybrid tower having a plurality of vertical rigid pipes that are secured to one another at various depths.

Additional bottom-to-surface flexible connections of the electric cable or electrohydraulic umbilical type are added after the hybrid tower has been installed, said additional bottom-to-surface connections generally extending continuously from the FPSO all the way to their destination, i.e. for an undersea well head situated several kilometers away from said FPSO.

In this context, it is recalled that the essential function of these dipping catenary portions of flexible lines is to absorb, at least in part, the movements of the rigid pipes to which such a line is fastened or attached, and/or the movements of the floating supports to which said flexible line is connected, by mechanically decoupling the movements respectively of said rigid pipes and of said floating supports. However another function is also to reduce the traction forces exerted by the flexible line on the undersea equipment on the sea bottom to which it is connected, where applicable.

Document FR 09/58096 in the name of the Applicant, filed on Nov. 17, 2009, discloses bottom-to-surface installations in which a plurality of flexible lines comprise line portions in the form of dipping catenary curves that are obtained by suspending a portion of said flexible line from a buoy at an intermediate depth between the bottom and the surface. For that purpose, said intermediate portion of flexible line or pipe is caused to pass via a trough defining a rigid bearing surface of convex curved shape.

Such a trough serves to give the portion of flexible pipe that it supports curvature that is controlled so as to avoid excessive curvature that would damage the hose irremediably. However installing such troughs and also flexible pipes over such troughs requires maneuvers that are complicated and lengthy and therefore expensive.

In FR 2 889 557, proposals are made to use a curvature limiter device that is constituted by a tubular member through which the pipe is threaded, which member is suitable for being pre-installed around the pipe either in a factory, or else on board a laying ship. The curvature limiter device is laid together with the pipe threaded through said curvature limiter device, the device presenting a rectilinear shape and outside diameter dimensions that are compatible with the dimensions of hatches for passing the pipe on board the laying ship, in particular at the bases of J-lay towers, that are used for unwinding and laying pipes at sea from a laying ship. It then suffices to suspend or attach the curvature limiter at an intermediate depth between the bottom and the surface, and then give it a curved shape with a convex side facing upwards so as to create on at least one of its sides a portion of flexible line or pipe that has the shape of a dipping catenary. That flexible tubular member constituting said curvature limiter as described in FR 2 889 557 comprises a plurality of tubular sleeves arranged end-to-end in an axial longitudinal direction and connected together loosely by annular members. Said sleeves and said annular members present non-cylindrical longitudinal ends that engage mutually in one another without being fastened to one another. More precisely, the sleeves present collars at each end that are curved radially outwards to form shoulders while the annular members present at each of their ends inward radial curvature forming shoulders in the opposite direction and suitable for co-operating by mutual engagement with the shoulders at the ends of said sleeves.

The annular sleeves and members as mutually engaged in this way in succession constitute a hinged assembly allowing movement between its various elements, both in the axial longitudinal directions of the sleeves and in lateral directions that are perpendicular to said axial longitudinal directions. Such movement enables the tubular member to be curved, with said curvature being limited by the maximum amount of movement allowed on upper faces of said annular sleeves and members when their bottom faces are at minimum movement.

That type of curvature limiter thus allows the flexible line or pipe to take up varying curvature, including a rectilinear position, while preventing the curvature of said flexible line dropping below a determined minimum radius of curvature.

Such curvature devices of the mutually engaged vertebrae type as described in patents FR 2 889 557 and U.S. 2010/0228295 have been known for a long time and were developed and used initially on the Chevron-Ninian site in the North Sea in 1978.

GB 2 334 048 also describes a curvature restrictor for a flexible pipe of the type comprising alternating and mutually engaged half-vertebrae.

That type of curvature limiter presents certain drawbacks. Firstly, they are difficult and expensive to fabricate since they require mutual engagement of parts that have been fabricated on a lathe with relatively high precision, and thus parts that are relatively expensive to fabricate. Similarly, assembling the various annular sleeves and members is relatively difficult and complex to achieve.

Furthermore, that curvature limiter device does not provide curvature that is stable and accurate, since its stability is associated solely with its own weight. Furthermore, that curvature limiter device can be deformed, particularly if it is pulled laterally in a direction perpendicular to its mean plane of curvature because the various mutually engaged unit elements are independent of one another and can be subjected to lateral movements relative to one another, which constitutes a drawback, in particular when it is desired to use a plurality of flexible lines and thus a plurality of curvature limiters that are located close together side-by-side, and in particular that are arranged on two opposite faces of a float or of a rigid column as described in FR 09/58096.

Another drawback of the curvature limiter device described in FR 2 889 557 stems from that fact that it limits the curvature of the flexible line in all directions, which, under certain circumstances, can impede or even prevent the flexible line fitted with said curvature limiter device being wound around a storage spool on board a laying ship.

Another drawback of the curvature limiter device described in FR 2 889 557 is that the pipe is clamped inside the sleeves to keep the curvature limiter in a position that is stationary relative to the pipe, which requires said curvature limiter device to be installed around a unit pipe element only after causing a pipe portion of corresponding length to pass through and be laid as a function of the depth at which said curvature limiter device is to be attached or suspended between the bottom and the surface.

SUMMARY OF THE INVENTION

The object of the present invention is thus to provide a novel type of curvature limiter device that is simpler to make, more reliable in terms of the accuracy and stability of the desired curved shape, and in particular without authorizing lateral movements between the various components of the device when it is used in a controlled curvature configuration.

Another object of the present invention is to provide a novel curvature limiter device that also makes it possible for it to be used in a configuration that provides curvature control by limiting curvature, and also in a configuration in which the device has no curvature-limiting effect, with it then being possible for said flexible line fitted with said curvature limiter to be curved with more than the maximum limiting curvature authorized in the preceding configuration.

More generally, the object of the present invention is to provide a curvature limiter device that is improved, that is simpler to make, and that is also simpler to use, in particular concerning its attachment at an intermediate position between the bottom and the surface.

To do this, the present invention provides a curvature limiter device forming a tubular member suitable for adopting a rectilinear position or variable curvature while preventing a radius of curvature that is less than a given minimum radius of curvature and thus authorizing a flexible line threaded inside said tubular member to take up a controlled variable degree of curvature or no curvature, said tubular member comprising a plurality of tubular sleeves arranged end-to-end at their longitudinal ends, preferably at least three sleeves, more preferably three to nine sleeves, the device being characterized in that said sleeves are fastened to one another by fastener-and-hinge pivot devices arranged on the top face of each of said sleeves, at their longitudinal ends, said fastener-and-hinge pivot devices allowing the longitudinal axis XX', $X_1X_1'$ of a first sleeve to pivot relative to the longitudinal axis XX', $X_2X_2'$ of a second sleeve fastened to said first sleeve by means of said fastener-and-hinge device, said pivoting taking place about a hinge axis YY', $Y_1Y_1'$, $Y_2Y_2'$ perpendicular to said two longitudinal axes XX', $X_1X_1'$, $X_2X_2'$ of said first and second sleeves, the two hinge axes YY', $Y_1Y_1'$, $Y_2Y_2'$ of the two fastener-and-hinge devices arranged at the two opposite longitudinal ends of each sleeve preferably being arranged at the same distance $L_2$ from the longitudinal axis XX', $X_1X_1'$, $X_2X_2'$ of said sleeve, said sleeves further including at their two longitudinal ends respective abutments of complementary shape arranged against the bottom faces of said sleeves in positions that are substantially diametrically opposite from said fastener-and-hinge devices, the two end faces of the two abutments at the facing longitudinal ends of said first and second sleeves being spaced apart from each other when said tubular member is in a rectilinear position, and presenting a common contact surface when said two abutments are in contact with each other as a result of maximum authorized pivoting of the two bottom faces of said two sleeves towards each other by means of said fastener-and-hinge devices.

It can be understood that:

said fastener-and-hinge device is such that downward pivoting of two sleeves by causing their bottom 25 faces to approach each other is limited by contact between their two abutments, where, in contrast, upward pivoting of the two sleeves by moving their top faces towards each other need be limited, where appropriate, only by contact between the longitudinal ends of their 30 top faces, if they were not themselves already fastened to another juxtaposed sleeve;

said abutments have the function of stabilizing the curved position of the curvature limiter device in said maximum authorized curvature and of making it reliable in terms of mechanical strength over time and when subjected to force;

the maximum angle of inclination α that is authorized between the longitudinal axes $X_1X_1'$ and $X_2X_2'$ of two successive sleeves by moving their bottom faces towards each other depends on the distance $L_3$ between said respective facing abutments when said tubular member is in its rectilinear position; and fastening the sleeves arranged end-to-end together by said fastener-and-hinge devices does not allow any longitudinal or lateral movement between the various sleeves with the exception of the natural clearance between mechanical parts that are fastened together, as explained below.

It can be understood that said sleeves have a said fastener-and-hinge device at each of their two longitudinal ends, except for the longitudinal ends of the two terminal sleeves that correspond to the two longitudinal ends of said tubular member.

The curvature limiter device as defined in this way is advantageous in that it makes it possible to achieve a said curvature in a manner that is more accurate and more stable.

Another advantage of the curvature limiter device of the present invention lies in that it can be curved with curvature limitation by moving the bottom faces of the sleeves towards each other, as described above, while also allowing inverse curvature by moving the top faces of the sleeves towards each other, with this curvature having no limit or having a limit at a smaller radius of curvature. This possibility of inverse curvature is advantageous more particularly in that it makes it possible firstly to use a flexible line fitted with said curvature limiter that is wound on a storage spool, in particular on board a laying ship, and secondly it makes it easier to lay a said flexible line fitted with said curvature limiter at sea and to attach said curvature limiter to a buoy or to a vertical undersea rigid column at an intermediate depth between the bottom and the surface, as explained below.

Another advantage of the device of the invention lies in that it can be fabricated more simply, in particular by machine welding said fastener-and-hinge devices and said abutments against the top and bottom faces respectively of said sleeves.

It can be understood that when the hinge axes YY', $Y_1Y_1'$, $Y_2Y_2'$ of the two fastener-and-hinge devices arranged on the top faces of the two opposite longitudinal ends of a given sleeve are spaced apart from each other by a given length $L_1$ on all of the sleeves for which the hinge axes YY', $Y_1Y_1'$, $Y_2Y_2'$ of said fastener-and-hinge devices are all at the same distance $L_2$ from said longitudinal axes XX', $X_1X_1'$, $X_2X_2'$ of the respective sleeves, said maximum pivot angles α are the result of contact between said two abutments on the bottom faces engaging in pairs, and are all identical, and said curvature limiter device authorizes a minimum circular radius of curvature $R_0$ for said flexible line inside the curvature limiter such that:

$$R_0 = \left(\frac{L_1}{2}\right) \times \cot\left(\frac{\alpha}{2}\right) - L_2$$

Also preferably, the various sleeves are all of the same shape, the same length, and the same inside and outside diameters.

In practice, said maximum authorized pivot angle α resulting from moving the bottom faces of two fixed-together sleeves towards each other as is made possible by said fastener-and-hinge device lies in the range 5° to 45°, and preferably n×α is at least 60°, and preferably lies in the range 60° to 150° when said tubular member comprises n said fastener-and-hinge devices, where n is an integer preferably lying in the range 3 to 21, more preferably in the range 5 to 15, and $L_1$=15 centimeters (cm) to 1 m, $L_2$=5 cm to 50 cm, and $R_0$=0.5 m to 5 m.

For reasons of ease of fabrication and machining, in a particular embodiment, said contact surface between said abutments comprises at least one plane.

In a preferred embodiment, said end faces of the two abutments comprise three-dimensional surfaces of complementary shapes, respectively of concave shape and of convex shape, such that said contact surface presents a three-dimensional shape preventing any lateral movement between said first and second sleeves relative to each other in a direction perpendicular to either of said longitudinal axes $X_1X_1'$, $X_2X_2'$ of said first and second sleeves, and having an effect of centering the longitudinal axes $X_1X_1'$, $X_2X_2'$ of said first and second sleeves substantially in a common radial axial longitudinal plane $P_0$ when said two abutments come into contact with each other.

This embodiment is particularly advantageous since it makes it possible to use fastener-and-hinge devices that accommodate a certain amount of clearance in a lateral direction, along the direction of said hinge axis YY'. This thus makes it possible to avoid using high-precision mechanics for achieving pivoting co-operation between the various parts in the fastener-and-hinge device. The recentering also makes it possible to avoid deformation and/or wear of said fastener-and-hinge devices. Finally, the recentering makes it possible to guarantee greater stability for the shape of the curvature limiter device, in particular with respect to possible lateral movements. The flexible pipe is then held safely in the same manner as on a trough of a prior art machine-welded structure.

In a first embodiment, the bottom abutment at one end of the first sleeve presents a convex or concave shape that is complementary to the concave or convex shape respectively of the facing abutment at the end of the second sleeve, each sleeve thus presenting two abutments of different shapes that are respectively concave and convex at its two longitudinal ends.

In a second embodiment, a first sleeve has two abutments of the same convex or concave shape, at each of its two longitudinal ends, said first sleeve being fastened at each end to a second sleeve presenting two abutments that are both of the same shape as the other, being respectively concave or convex.

More particularly, said contact surface is made up of two planes forming a dihedral angle with a common ridge, said ridge preferably being arranged in alignment with a straight line $D_0$ intersecting said hinge axis $YY'$, $Y_1Y_1'$, $Y_2Y_2'$ of said corresponding fastener-and-hinge device. It can be understood that said ridges of the two abutments thus come together substantially in the same said longitudinal axial plane $P_0$ when the abutments come into contact with each other, and all of the elements of the device are thus held substantially in a common longitudinal axial plane $P_0$.

Also advantageously, said two abutments at said facing longitudinal ends of said first and second fastened-together sleeves include latch elements suitable for holding said abutments latched one against the other as soon as they come into contact with each other via a said contact surface in the event of said maximum pivoting $\alpha$.

More particularly, a first abutment at the end of a first sleeve has a hook that is pivotally mounted on said first abutment, and a second abutment at the end of the second sleeve and facing the first abutment includes a shape suitable for being hooked by said hook when the two abutments come into contact with each other via a said contact surface, a resilient return element co-operating with said hook to hold the two abutments in said contact by preventing the two abutments from moving apart from each other once they have come into said contact.

Still more particularly, said fastener-and-hinge device of the first and second sleeves comprises:
  a first fastener-and-hinge element comprising at least one first part defining at least one first plane face arranged in a said radial plane $P_0$ on the top face of said first sleeve at its longitudinal end facing said second sleeve, said first part having a circular orifice in said first plane face, said orifice passing transversely at least through said first part in a direction of said hinge axis $YY'$, $Y_1Y_1'$, $Y_2Y_2'$ perpendicular to said axial longitudinal directions $XX'$, $X_1X_1'$, $X_2X_2'$ of the first and second sleeves; and
  a second fastener-and-hinge element comprising at least one second part defining at least one second plane face arranged in a said radial plane $P_0$ on the top face of said second sleeve at its longitudinal end facing said first sleeve, said second part having a circular orifice in said second plane face, said orifice passing transversely at least through said second part in the direction of said hinge axis $YY'$, $Y_1Y_1'$, $Y_2Y_2'$ perpendicular to said axial longitudinal directions $XX'$, $X_1X_1'$, $X_2X_2'$ of the first and second sleeves; and
  a pin passing transversely at least through said first and second parts via their said orifices.

It can be understood that:
  said first and second faces are arranged facing each other, where appropriate, substantially one against the other, and said fastener-and-hinge devices are hinged to pivot about said pin, the pin thus forming a hinge pin;
  the curvature limiter device of the present invention is thus constituted by end-to-end fastening of regular unit elements, each comprising a said tubular sleeve fitted at its two longitudinal ends with:
    on its top face, a said first fastener-and-hinge element at one end and a said second fastener-and-hinge element at the other end; and
    against its bottom face, said abutments positioned substantially diametrically opposite said first and second fastener-and-hinge elements; and
  said first fastener-and-hinge element of a first sleeve is fastened with said second fastener-and-hinge element of a second sleeve by means of said pin arranged through said orifices of said first and second fastener-and-hinge elements.

The terms "top face" and "bottom face" are used herein for a said sleeve to designate the outside top surface and the outside bottom surface of said sleeve, which surfaces are in particular cylindrical surfaces.

More particularly, said sleeve has a cylindrical outside surface, in particular a surface of circular cross-section, that defines an outside diameter and also a cylindrical central passage that is likewise of circular section and that defines an inside diameter.

It can also be understood that said tubular element has two terminal unit elements, each comprising a said sleeve fitted with a single said first or respectively second fastener-and-hinge element at only one longitudinal end of said terminal element.

Also advantageously, in the fastener-and-hinge device of the invention:
  said first fastener-and-hinge element comprises at least one said first perforated part respectively defining two facing parallel plane faces, including a said first face, said two plane faces defining an empty space and being arranged apart from each other at a distance d; and
  said second fastener-and-hinge element comprises at least one second flat part having two parallel opposite plane faces including at least a said second face;
  said second flat part of a first sleeve being fastened to and interposed between the two said facing plane faces of said first fastener-and-hinge element of a second sleeve in such a manner that the orifices of the two opposite plane faces of said second flat part are arranged facing respective orifices in the two plane faces of said first fastener-and-hinge element.

It can be understood that the two opposite plane faces of said second flat part are arranged at a distance apart that defines the thickness of said second flat part, this thickness being less than the thickness d between the two plane faces of said first fastener-and-hinge element so that said second part can be interposed between said two parallel plane faces of said first fastener-and-hinge element.

This embodiment is particularly advantageous in that interposing a said second flat part between said two plane faces of a said first flat part provides lateral guidance in particular preventing any lateral movement of said first and second sleeves relative to each other by considerably limiting the movement clearance of said second part relative to said first part in said direction of the hinge axis $YY'$.

In a preferred embodiment, said fastener-and-hinge device comprises:
  a said first fastener-and-hinge element at the end of a said first sleeve having two said first perforated flat parts each having two parallel opposite plane faces, the two first flat parts being arranged side by side and parallel at a said distance d apart from each other; and
  a said second fastener-and-hinge element at the longitudinal end of a said second sleeve having two said second perforated flat parts each having two parallel opposite plane faces, the two second flat parts being arranged side by side and parallel at a said distance d apart from each other;
  a said first flat part of said first sleeve being interposed between said two second flat parts of the second sleeve, and a said second flat part of the second sleeve being interposed between said two first flat parts of the first sleeve; and
  a common said pin being arranged through the orifices of said two first flat parts of the first sleeve and of said two second flat parts of the second sleeve as interposed in this way.

This embodiment is particularly advantageous since the shear stresses in the axial direction $XX'$ at said pin are taken up via a larger number of shear planes, specifically in this configuration three shear planes p'$_1$, p'$_2$, and p'$_3$ (cf. FIG. 12B) between three plane faces of said two first parts facing three plane faces of said two second parts.

In addition, interposing a said first flat part between two said second flat parts and interposing a said second flat part between two said first flat parts improves lateral guidance by preventing any lateral movement of said first and second sleeves relative to each other, in particular by reducing the movement clearance of said first part relative to said second part in the direction of the hinge axis YY'.

According to yet another preferred characteristic of the present invention, the curvature limiter device includes a locking device enabling a said flexible line to be locked inside said curvature limiter device, thereby preventing them from moving relative to each other laterally and/or longitudinally, the inside diameter of said sleeve being greater than the outside diameter of said flexible line.

The term "lateral" relative movement is used herein to mean movement in a direction perpendicular to said axial longitudinal direction of said sleeve.

More particularly, said locking device comprises at least one strap, preferably at least two straps, each strap passing through two orifices in the periphery of a sleeve, preferably a central sleeve of said tubular member, the two orifices being arranged close to each other and positioned at the same level in the axial longitudinal direction XX' of said sleeve, each strap passing around at least part of said flexible line inside said sleeve and exiting at its two ends via the two orifices respectively.

It can be understood that where appropriate the second strap and a second pair of orifices are arranged in a different position in the axial longitudinal direction XX' of said sleeve, relative to the first strap and the first pair of orifices in the sleeve.

Advantageously, each said tubular sleeve is made up of two half-sleeves of semicircular section that are fastened to each other. It can be understood that under such circumstances said resulting tubular sleeve has a cylindrical longitudinal central orifice of circular cross-section and that each half-sleeve presents a cross-section of semicircular internal outline.

This characteristic is advantageous since it enables the curvature limiter to be installed on the flexible pipe once it has been completely terminated, i.e. once it already has end connectors fitted thereto. End connectors are too bulky to be capable of passing through the inside of the tubular sleeves of the curvature limiter.

According to another advantageous characteristic, the curvature limiter device of the invention includes a winch on its bottom face at one longitudinal end and a cable wound at one end on said winch, the other end of the cable being attached to an attachment element arranged at the other longitudinal end of said tubular member on its bottom face, thereby enabling said cable to be tensioned by actuating said winch to wind said cable around said winch and thus move the two longitudinal ends of said tubular member towards each other in order to create a said curvature.

This characteristic is particularly advantageous, in particular when the pipe is not sufficiently flexible for the curvature limiter to be capable of adopting its maximally curved position solely by the weight of the flexible pipe in the catenary configuration, as explained below.

The present invention also provides a bottom-to-surface connection installation between undersea equipment such as an undersea well head or the end of an undersea pipe resting on the sea bottom, and a support floating on the surface, the installation comprising an undersea flexible line of curvature that is controlled by a said curvature limiter device of the invention, said flexible line being threaded inside said tubular member and said curvature limiter device being arranged at an intermediate depth between the sea bottom and the surface.

More particularly, said bottom-to-surface connection comprises a hybrid tower constituted by a flexible pipe extending from a said floating support to the top end of a rigid riser column or vertical riser having its bottom end connected to undersea equipment or to one end of an undersea pipe resting on the sea bottom, said installation further comprising at least one curvature limiter device attached to said riser column, preferably including at least two curvature limiter devices attached at the same depth to two diametrically opposite faces of said riser column.

The present invention also provides a method of laying an undersea line between a floating support on the surface and the sea bottom in a bottom-to-surface connection installation of the invention from a laying ship on the surface, the curvature of said undersea flexible line being controlled by a said curvature limiter device of the invention that is arranged at an intermediate depth between the sea bottom and the surface, the method comprising the following successive steps:

1) arranging said curvature limiter device in a rectilinear position on the deck of a laying ship and unwinding said flexible line from a spool on the deck of the ship while causing the flexible line to pass through said curvature limiter device in a fixed position on the deck of the ship;

2) attaching the end of said flexible line to a said floating support on the surface;

3) continuing to unwind said flexible line through said curvature limiter while moving the laying ship away from said floating support so that said flexible line adopts a dipping catenary; and 4) when a given length $L_0$ of flexible pipe has been unwound by passing through said curvature limiter device in its rectilinear position, locking said curvature limiter device on said flexible line with the help of a locking device, said curvature limiter device then being entrained with said flexible line while it is being laid, the curvature limiter device being in an inverted curvature configuration with a small amount of curvature and with its concave sides facing upwards;

5) bringing the curvature limiter device towards a vertical rigid column or suspending it from a subsurface float and continuing to unwind said flexible line in such a manner that the curvature limiter adopts a said maximum curvature $R_0$ with its concave side facing downwards, said curvature limiter thus defining two portions of flexible line in dipping catenary shape firstly between said floating support and said curvature limiter device, and secondly between said curvature limiter device and said laying ship; and 6) continuing to lay said flexible line until the low point that is tangential to the horizontal of the dipping catenary of the second portion of the flexible line between said curvature limiter device and the laying ship on the surface reaches the sea bottom and then continuing to lay said flexible line on the sea bottom while moving the laying ship away from the floating support and while unwinding said flexible line from the spool on the deck of the laying ship.

This laying method is made possible by the property of the curvature limiter device of the invention whereby it is capable of adopting inverse curvature, which property is made use of above.

BRIEF DESCRIPTION OF THE DRAWINGS

Other characteristics and advantages of the present invention appear better in the light of the following detailed description made by way of non-limiting illustration and with reference to the drawings, in which:

FIGS. 1A and 1B are side views in section of a curvature limiter of the invention in a rectilinear configuration, respectively without a flexible pipe (FIG. 1A) and with a flexible pipe (FIG. 1B);

FIG. 1C is a side view in section of a curvature limiter in its maximally-curved configuration;

FIG. 2 is a side view in section of a regular element of the FIG. 1 curvature limiter presenting added bottom abutments;

FIG. 3A is a section on plane AA of FIG. 2;

FIG. 3B shows a variant of FIG. 3A in which the regular element is made up of two half-shells that are assembled together;

FIG. 4A is an end view looking along direction B in FIG. 2 showing the bottom abutment of a regular element;

FIG. 4B is a plan view looking along direction C in FIG. 2 showing the approach of the bottom abutment of a regular element N having a first sleeve towards the corresponding abutment of the regular element N+1 having a second sleeve connected end-to-end with the first sleeve by a top fastener-and-hinge device 6, the two abutments initially being laterally offset by a value "e" corresponding to the clearance in the lateral direction of the hinge axis YY' between the first fastener-and-hinge element $6_1$ of the first sleeve and the second fastener-and-hinge element $6_2$ of the second sleeve;

FIG. 4C shows the final stage of approach following the prior stage of FIG. 4B, the two abutments of the elements N and N+1 being in contact and providing a recentering effect in a common longitudinal direction XX' on the two elements N and N+1 by the dihedral shape of the contacting surfaces of the abutments;

FIG. 5 is a side view in section of a curvature limiter fitted with a winch and a cable suitable for imposing maximum curvature on said curvature limiter by applying traction on said cable;

FIGS. 6A and 6B are side views in section showing details of a latch device at the bottom abutments of two adjacent regular elements N and N+1, respectively in a rectilinear configuration (FIG. 6A) and in a locked maximum-curvature configuration (FIG. 6B);

DETAILED DESCRIPTION OF THE PRESENTLY PREFERRED EMBODIMENTS

Figure 7:
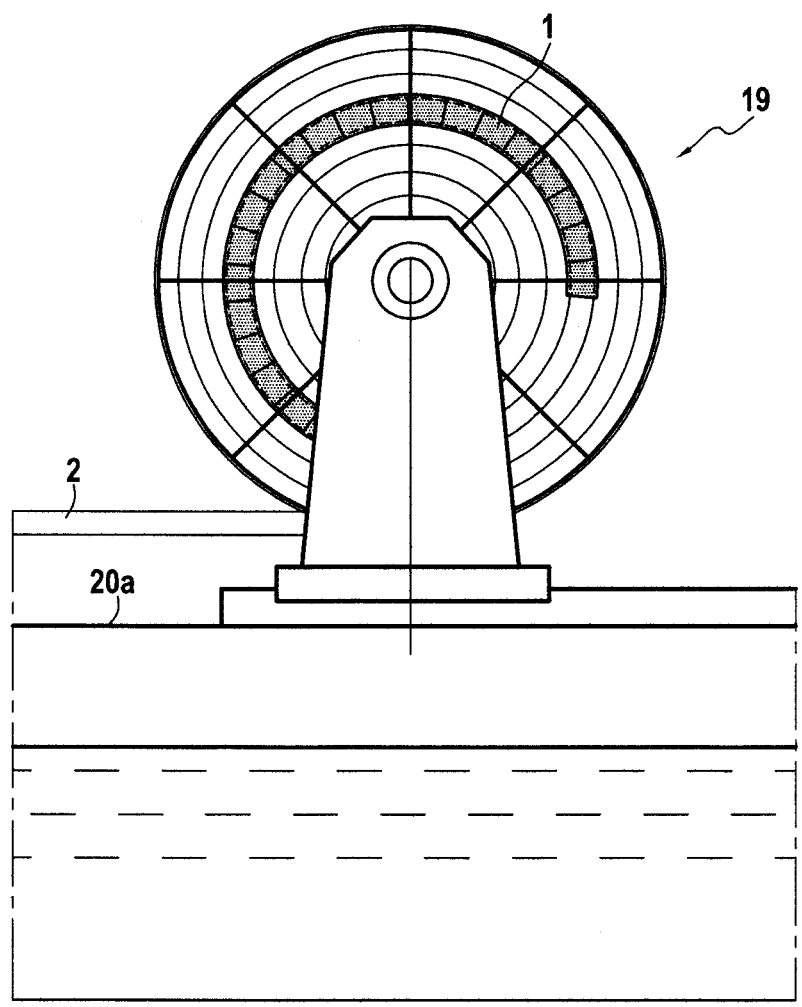
FIGS. 7, 7A, 7B, and 7C, which are not drawn to scale so as to better illustrate support 20b, are side views showing the start of installing a flexible pipe fitted with a curvature limiter of the invention, respectively, before the hose is unwound (FIG. 7), at the beginning of unwinding the hose (FIG. 7A), while laying (FIG. 7B), with the hose sliding freely through the curvature limiter to a dimension $L_0$ at which said curvature limiter is locked onto said hose, followed by regular laying after said curvature limiter has gone past the stern trough of the laying ship (FIG. 7C)

FIG. 1A is a side view in section of a curvature limiter 1 of the invention in a rectilinear configuration. In FIG. 1B, it is installed around a flexible pipe 2 and is secured thereto via two locking devices 3 shown in their released positions 3a in FIGS. 10A and 10C, and in their locked positions 3b in FIGS. 10A and 10B.

In FIG. 1C, said curvature limiter 1 is shown in its maximum curvature configuration (radius of curvature $R_0$), said curvature being less than the limiting curvature ($R>R_0$) that can be withstood by said flexible pipe 2 without damage.

The curvature limiter is made up of an assembly of hinged-together elements, namely a plurality of regular elements 4, plus two preferably identical end elements 4a, and a central element 4b having a locking device 3 for locking on the flexible pipe 2 and also having a hoist ring $4b_1$ enabling the curvature limiter device to be attached to a support that is described in greater detail in the description of the invention.

FIG. 2 is a side view in section showing a regular element constituted by a sleeve or tube of circular section having its inside diameter machined at each of its ends into an outwardly-flared cone shape 5a, i.e. of diameter that increases from the regular portion 5b towards the end 5a so as to avoid making angular contact with the flexible pipe 2, where such contact would be dangerous for its integrity.

The curvature limiter 1 is made up of a plurality of regular elements 4 that are fastened successively to one another end-to-end by top fastener-and-hinge pivot devices 6 at each of their longitudinal ends, and also having two terminal elements 4a, each of which has only one fastener-and-hinge device 6 at only one of its longitudinal ends that is fastened to the single regular element 4 that is fastened thereto.

Each regular element 4 or each terminal element 4a of the curvature limiter 1 is made up of a circular section tubular sleeve 5 of inside diameter that is greater than the outside diameter of the flexible pipe 2, so the flexible pipe can be threaded freely therethrough when the locking devices 3 are in the released position.

At its two longitudinal ends, each sleeve 5 of a regular element 4 has respective first and second fastener-and-hinge elements $6_1$ and $6_2$ arranged on the top face of the sleeve, each having an orifice 6a of axis YY', $Y_1Y_1'$, $Y_2Y_2'$ perpendicular to the axial longitudinal direction XX', $X_1X_1'$, $X_2X_2'$ of said sleeve.

Each said fastener-and-hinge device 6 of the first and second sleeves is constituted by a first fastener-and-hinge element $6_1$ of the first sleeve and a second fastener-and-hinge element $6_2$ of the second sleeve that are arranged in such a manner that their orifices 6a are in register with each other, said orifices 6a having a pin $6_3$ passing therethrough to form a hinge pin of said fastener-and-hinge device 6 serving to connect the first and second sleeves together.

Said first fastener-and-hinge element $6_1$ at a first end of a said sleeve is preferably constituted by two first perforated flat parts referred to below as fastener tabs $6_1a$ and $6_1b$, each having two opposite plane faces all extending in planes parallel to said axial longitudinal direction XX' of said sleeve.

A single plane face of one of the two first flat parts or fastener tabs $6_1a$, $6_1b$ and referred to as the "first" face lies in a longitudinal axial plane or radial plane $P_0$ of said sleeve, said first plane face facing a second plane face laying substantially in the same substantially radial plane $P_0$ of a flat part of said second fastener-and-hinge element at the longitudinal end of a second sleeve and that is fastened thereto as described below.

Likewise, and preferably, a second fastener-and-hinge element $6_2$ at the other longitudinal end of said sleeve is constituted by two second perforated flat parts or fastener tabs $6_2a$, $6_2b$ each likewise having two opposite parallel plane faces extending in the axial longitudinal direction of said sleeve, with only one plane face of one of the two flat parts of the second fastener-and-hinge element $6_2$, referred to as the "second" plane face lying in a said substantially radial plane $P_0$ of said sleeve.

The two flat parts $6_1a$ and $6_1b$ of said first fastener-and-hinge element $6_1$ are spaced apart from each other by a distance d that is slightly greater than the thickness of one of the two flat parts $6_2a$, $6_2b$ of the second fastener-and-hinge element $6_2$, i.e. a flat part of the second fastener-and-hinge element $6_2$ that includes a said second plane face. This distance d is slightly greater than the distance between the two opposite plane faces of said flat part of the second fastener-and-hinge element $6_2$.

In the same manner, the two flat parts of the second fastener-and-hinge element $6_2$ are spaced apart from each other by a distance d that is slightly greater than the thickness of the flat part of said first fastener-and-hinge element $6_1$ having a said first plane face, i.e. slightly greater than the distance between the two opposite plane faces of said flat part of said first fastener-and-hinge element $6_1$.

By way of example, the distance d between two flat parts or fastener tabs of the first or second fastener-and-hinge elements $6_1$, $6_2$ is greater by an amount equal to 1 mm relative to the thickness of the flat part of the second or first fastener-and-hinge element, respectively. This value corresponds to clearance e of 1 mm in said direction of the hinge axis YY', $Y_1Y_1'$, $Y_2Y_2'$ of each flat part of said first or second fastener-and-hinge element $6_1$, $6_2$ of a first sleeve that is interposed between the two flat parts of the second or first fastener-and-hinge element, respectively.

The two flat parts $6_1a$, $6_1b$ of a first fastener-and-hinge element $6_1$ of a first sleeve, and the two flat parts $6_2a$, $6_2b$ of a second fastener-and-hinge element $6_2$ of a second sleeve are arranged to be offset relative to one another and relative to said radial plane $P_0$ in such a manner that one flat part of each said first or second fastener-and-hinge element $6_1$, $6_2$ of a first sleeve is interposed between the two flat parts of a second fastener-and-hinge element $6_2$ of the second or first sleeve respectively with which it is fastened by means of the four orifices $6_3$ in the four flat parts $6_1a$-$6_1b$, $6_2a$-$6_2b$ having a common pin $6_3$ passing transversely therethrough in a said hinge axis direction YY', $Y_1Y_1'$, $Y_2Y_2'$, with the set of four flat parts $6_1a$-$6_1b$, $6_2a$-$6_2b$ and said pin $6_3$ thus forming a said fastener-and-hinge device 6 between first and second sleeves.

It can be understood that the first and second fastener-and-hinge elements $6_2$ situated respectively at the two longitudinal ends of a given sleeve do not form parts of the same fastener-and-hinge device 6, but that their flat parts are nevertheless arranged to be offset relative to one another and relative to said radial plane $P_0$ in the same manner as the first and second fastener-and-hinge elements $6_1$ and $6_2$ at the facing longitudinal ends of first and second sleeves that are fastened together.

Figure 11A:
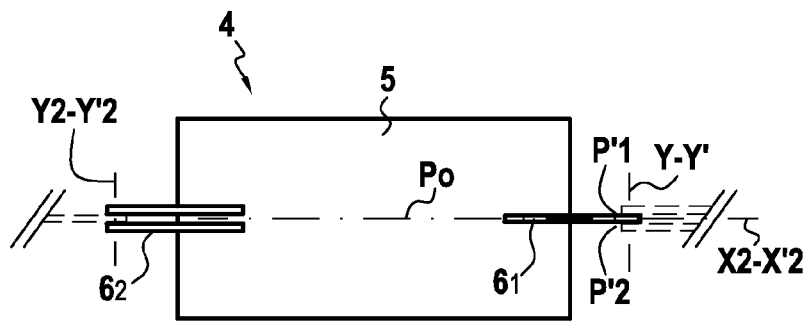
FIGS. 11A and 11B show an embodiment in which the sleeve 5 of a regular element 4 of the curvature limiter device 1 has a first fastener-and-hinge element $6_1$ at one end with a single flat first part, and a second fastener-and-hinge element $6_2$ at its other longitudinal end with two second flat parts of the same shape as said first flat part, the two second flat parts thus forming two flat parts that are spaced apart from each other by a distance that is slightly greater than the thickness of the single flat part of the first fastener-and-hinge device $6_1$, with this being shown in plan view (FIG. 11A) and in cross-section view showing the single flat part of the first fastener-and-hinge element $6_1$ of a first sleeve interposed between the two flat parts of the second fastener-and-hinge element $6_2$ at the longitudinal end of a second sleeve to which it is fastened.
Figure 11B:
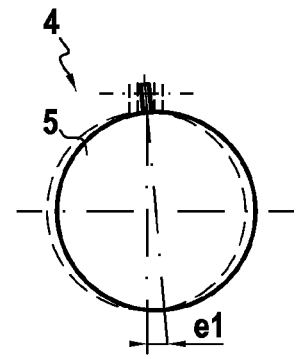
Figure 12A:
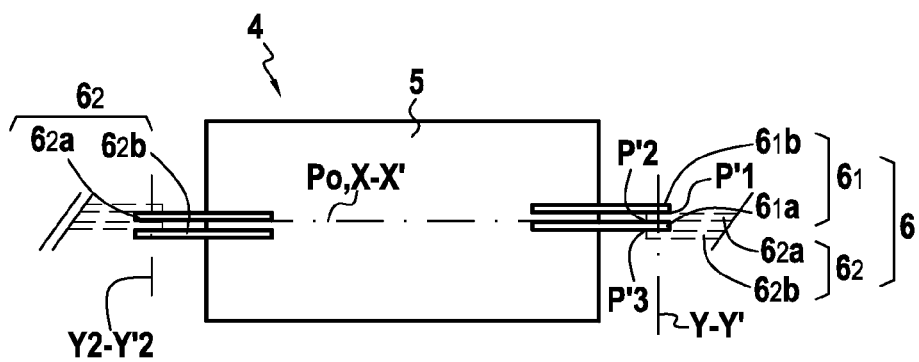
FIGS. 12A and 12B show a preferred embodiment in which each of the first and second fastener-and-hinge elements $6_1$ and $6_2$ at respective longitudinal ends of the sleeve 5 of a regular element 4 of the curvature limiter device 1 has two identical flat parts spaced apart from each other and offset relative to a radial axial plane $P_0$ in such a manner that a flat part of each of said first and second fastener-and-hinge elements $6_1$ and $6_2$ is interposed between the two flat parts respectively of the second and first fastener-and-hinge elements $6_2$ and $6_1$ respectively of two sleeves that are fastened thereto end-to-end at the two longitudinal ends of the regular element 4 shown in plan view in FIG. 12A and in cross-section view in FIG. 12B through said interposed first and second fastener-and-hinge elements $6_1$ and $6_2$.
Figure 12B:
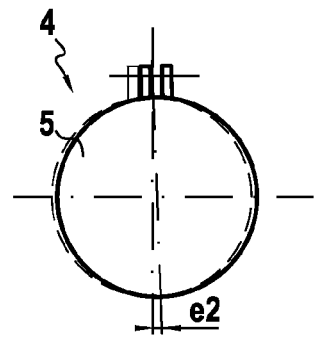
Figure 13A:
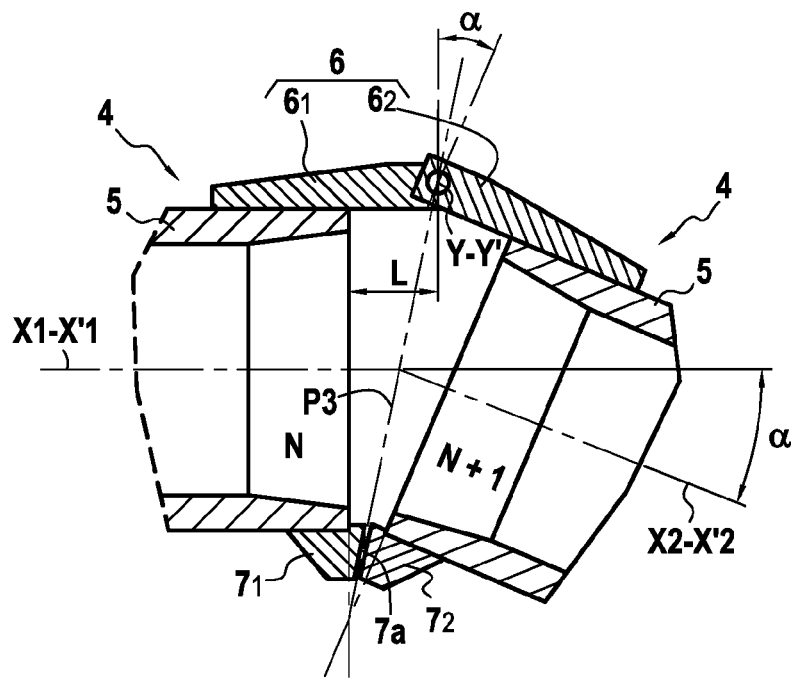
FIGS. 13A and 13B are a side views in longitudinal section showing two regular elements 4 of a curvature limiter device fastened to each other by a top fastener-and-hinge element 6 in the maximum curvature position, their bottom abutments $7_1$ and $7_2$ being in contact one against the other, the first and second fastener-and-hinge elements $6_1$ and $6_2$ and the two bottom abutments $7_1$ and $7_2$ of the first and second sleeves 5 of the two regular elements 4 numbered N and N+1 that are fastened to each other and of the same shape, being arranged symmetrically (FIG. 13A), or being of different shapes and being in arrangements that are not symmetrical (FIG. 13B).
Figure 13B:
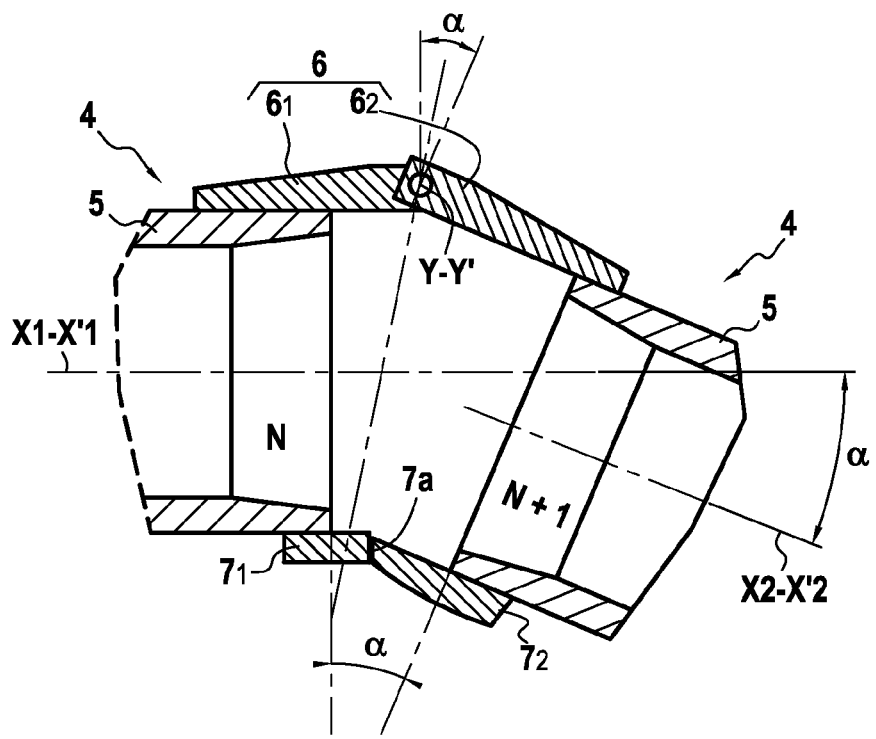

The embodiment shown in FIGS. 12A and 12B in which each said first and second fastener-and-hinge elements $6_1$-$6_2$ comprises two flat parts is advantageous compared with the embodiment shown in FIGS. 11A and 11B in which one of the first and second hinge-and-fastener elements $6_1$-$6_2$ has only one flat part.

In FIGS. 11A and 11B, the hinge axis YY' and the pin $6_3$ are stressed in two shear planes $p_1$ and $p_2$, whereas in FIGS. 12A and 12B, the shear stresses in the axial direction XX' are taken up via three shear planes $p_1$, $p_2$, and $p_3$, thereby correspondingly reducing the stresses on said axis YY' and in said pin $6_3$. When each of said first and second fastener-and-hinge elements $6_1$, $6_2$ has two flat parts, with one of the flat parts of each of said first and second fastener-and-hinge elements $6_1$, $6_2$ being interposed between the two flat parts of the other fastener-and-hinge elements $6_2$, $6_1$, i.e. of the second or first element respectively, there are three shear planes $p_1$, $p_2$, and $p_3$ corresponding to the three plane faces of the two flat parts of the first fastener-and-hinge element $6_1$ that are arranged facing three plane faces of the two flat parts of the second fastener-and-hinge element $6_2$ as a result of being interposed in this way.

In addition, as shown in FIGS. 11B and 12B, lateral guidance in the direction YY' at a hinge is improved when said first and second fastener-and-hinge elements $6_1$ and $6_2$ both have two flat parts, as shown in FIGS. 12A and 12B, as compared with the situation in which one of the first and second fastener-and-hinge elements $6_1$ and $6_2$ has only one flat part, as shown in FIGS. 11A and 11B.

Although in both cases interposing the first and second fastener-and-hinge elements $6_1$ and $6_2$ via at least one flat part of each of them between two flat parts of the other provides lateral guidance preventing any lateral movement in the direction of the hinge axis YY', other than a small amount of clearance $e_1$, $e_2$, i.e. movement along the pin $6_3$ passing through the perforations $6a$, the maximum clearance $e_2$ in FIG. 12B is less than the maximum clearance $e_1$ in FIG. 11B. This results in the fact that in the embodiment of FIGS. 11A and 11B, only the single flat part $6_1$ of the first fastener-and-hinge element $6_2$ is interposed between the two flat parts of the second fastener-and-hinge element $6_2$, with the two flat parts of the second fastener-and-hinge element $6_2$ coming into lateral abutment via only one of their faces against the single flat part of the first fastener-and-hinge element $6_1$.

At the two longitudinal ends of each sleeve 5, in its bottom portion, substantially in said radial plane $P_0$, i.e. substantially diametrically opposite from said first and second fastener-and-hinge elements $6_1$ and $6_2$, there are arranged two respective abutments $7_1$ and $7_2$ referred to as "bottom" abutments. Said flat parts $6_1 a$-$6_1 b$, $6_2 a$-$6_2 b$ and said abutments $7_1$-$7_2$ are fitted respectively on the top face and on the bottom face at the longitudinal ends of the sleeves 5 by bolting, or preferably by welding. The faces are referred to as "top" or "bottom" because in general the curvature limiter 1 is positioned in such a manner as to support an undersea flexible line by creating curvature with its concave side directed towards the sea bottom 16, i.e. downwards, in which case the abutments $7_1$ and $7_2$ need to be positioned on said bottom faces, while the convex faces of the curvature of the curvature limiter and of the flexible line both face upwards, thus requiring the fastener-and-hinge devices 6 to be fitted to the top faces, i.e. facing upwards towards the sea surface 17.

The bottom abutments $7_1$ and $7_2$ are not necessarily of the same shape, but under all circumstances they present respective front faces $7_1 a$, $7_2 a$ of plane or three-dimensional shape such that when said abutments $7_1$, $7_2$ at two facing ends of two fastened-together sleeves come into contact in the event of maximum pivoting α of the fastener-and-hinge device 6 of the two sleeves, said front faces $7_1 a$ and $7_1 b$ of the two abutments $7_1$ and $7_2$ present a common contact surface $7a$ that is preferably plane or three-dimensional.

Two adjacent regular elements 4 that are hinged together by a fastener-and-hinge device 6 may either be in a rectilinear configuration R, as shown in FIGS. 1A and 1B, or else present curvature of radius R down to the minimum curvature radius $R_0$, corresponding to contact being made between the front face $7_1 a$ of the regular element N and the front face $7_2 b$ of the regular element N+1.

It should be observed that the curvature, shown as being downward in FIG. 1C, could equally well be upward in the opposite direction, i.e. the curvature could be inverted. Under such circumstances, there is no curvature-limiting effect. This is advantageous, since curvature in this direction enables the curvature limiter device 1 to be put into place around a flexible pipe 2 during storage and transport of the flexible pipe wound on spools, in particular on board laying ships 20, while using a radius of curvature that is less than $R_0$, as explained in greater detail below when describing FIG. 7A. Furthermore, this possibility of inverse curvature is advantageous while laying the curvature limiter device at sea as is likewise explained below, when describing FIG. 8.

In a non-preferred embodiment, as shown in FIGS. 2, 6A, 6B, and 13A, each said abutment $7_1$-$7_2$ presents a plane front face $7_1 a$, $7_1 b$ lying in a respective plane $P_1$, $P_2$ containing the hinge axis YY' of the fastener-and-hinge device 6. In this non-preferred version of the invention, the bottom abutment $7_1$, $7_2$ may be made merely by milling the bottom portion of the longitudinal end of the tubular sleeve 5 to occupy the plane $P_1$, $P_2$ that contains the hinge axis YY'. In this embodiment, the planes $P_1$, $P_2$ are inclined by the same angle α/2 relative to the plane of the cross-section perpendicular to the longitudinal axes $X_1 X_1'$ and respectively $X_2 X_2'$ of the tubular sleeve 5, and the maximum pivot angle for the longitudinal axis $X_1 X_1'$ of the first sleeve of element N relative to the longitudinal axis $X_2 X_2'$ of the second sleeve of regular element N+1 is α.

It can be understood that the two planes $P_1$ and $P_2$ coincide on a bisector plane $P_3$ when the two front faces $7_1 a$ and $7_2 a$ are in contact, the plane $P_3$ being a bisector plane containing a bisector of the two longitudinal axes $X_1 X_1'$ and $X_2 X_2'$.

In a preferred version of the invention shown in FIGS. 4A-4B-4C, the abutment $7_1$ of the regular element N presents a face $7_1 a$ that is not plane, but forms a convex dihedral angle with a plane of symmetry $P_0$ containing the longitudinal axis $X_1 X_1'$, $X_2 X_2'$, as shown in FIG. 4B, and the corresponding abutment $7_2$ of the adjacent element N+1 presents a front face $7_2 a$ of complementary shape, i.e. having a concave dihedral angle. Under such circumstances, it is the ridge $7b$ of the dihedral angle that is in alignment with a straight line $D_0$ passing via the hinge axis YY'. Because lateral clearance e may exist in the direction of the axis of rotation YY', $Y_1 Y_1'$, $Y_2 Y_2'$ at the fastener-and-hinge device 6 when the device 1 is approaching maximum curvature $R_0$, the two abutments $7_1$, $7_2$ may be offset in the direction YY', $Y_1 Y_1'$, $Y_2 Y_2'$ by a value "e" as shown in FIG. 4B. However, as soon as the abutments $7_1$, $7_2$ come into contact, they recenter automatically so that the ridges $7b$ of the dihedral angles of their front faces $7_1 a$, $7_1 b$ (and thus the sleeves N and N+1) coming into alignment substantially in the same axial longitudinal plane in the radial plane $P_0$. As a result, all of the regular elements 4 of the curvature limiter 1 have their longitudinal axes XX', $X_1 X_1'$, $X_2 X_2'$ lying in substantially the same radial plane $P_0$ (ZOX). In contrast, if the front faces $7_1 a$ and $7_2 a$ are plane, this recentering effect does not occur and, on the contrary, a plurality of offsets "e" at each of the fastener-and-hinge devices 6 can accumulate so that the device is then not laterally stable along the axis YY'. Under the effect of currents, it is then possible for lateral instabilities to occur, i.e. alternating movements at the contacting plane abutment $7_1 a$, $7_1 b$ which can lead to wear, and thus to an undesirable reduction in the radius of curvature $R_0$. Thus, the dihedral shape is very advantageous since all of the elements of the device are held in a common radial plane $P_0$, and the flexible pipe is thus kept safe, in the same manner as on a trough of a prior art machine-welded structure.

It is possible to achieve recentering of the regular elements relative to one another by using shapes other than the above-described complementary concave-convex dihedral shapes, such as complementary curved shapes, and in particular complementary concave-convex circular shapes or complementary concave-convex parabolic shapes. Nevertheless, a dihedral angle remains a shape that is simple to machine and therefore constitutes the preferred version of the invention.

Under all circumstances, the maximum angle of rotation α between the longitudinal axes $X_1 X_1'$ and $X_2 X_2'$ fastened to each other by means of a said fastener-and-hinge device 6 is about 20°, as shown in the figures, such that when the curvature limiter 1 comprises five regular elements 4 and two terminal elements 4a fastened end-to-end to one another by means of six respective fastener-and-hinge devices 6 that are spaced apart from one another by a common distance $L_1$ and that are positioned with hinge axes YY', $Y_1Y_1'$, $Y_2Y_2'$ at a common distance $L_2$ from the longitudinal axes XX', $X_1X_1'$, $X_2X_2'$ of the sleeves, as shown in FIG. 1C, the longitudinal axes of the two terminal elements 4a are at an angle of 6×20=120°, corresponding to a radius of curvature $R_0$=1.68 m, when $L_1$=0.7 m, and $L_2$=0.3 m.

FIG. 3B is an end view in section showing a variant embodiment of the regular elements in which the tubular sleeve 5 is made up of two half-shells $5_1$ and $5_2$. Each of the half-shells presents respective fastener tabs $8_1$ and $8_2$ on either side, which tabs are secured to said half-shells by welding, for example, and they are assembled together by bolts 8a (not shown). This arrangement is advantageous since it enables a curvature limiter 1 to be installed on a fully terminated flexible pipe 2, i.e. a pipe already having its end connectors. The curvature limiter 1 of FIG. 3A requires said flexible pipe 2 to be passed through all of the elements 4 of the curvature limiter 1 before it is possible to install end connectors since they are generally bulky and therefore cannot pass through said curvature limiter 1.

The end elements 4a of the curvature limiter 1 have only one hinge 6 and one abutment $7_1$, $7_2$ at one end. At their other ends, without a hinge 6 or abutments $7_1$, $7_2$, it is advantageous to install a curvature transition element $4a_1$, that is known to the person skilled in the art that is of cylindrical-and-conical shape, and that is made of an elastomer or thermoplastic material, such as polyurethane, which transition element is secured to said end of said end element 4a. All of the other parts of the curvature limiter device, namely the sleeves 5, the abutments $7_1$, $7_2$, and the flat parts $6_1a$-$6_1b$, $6_2a$-$6_2b$ together with the pins $6_3$ making up the fastener-and-hinge devices 6 are advantageously all made of steel.

Figure 9A:
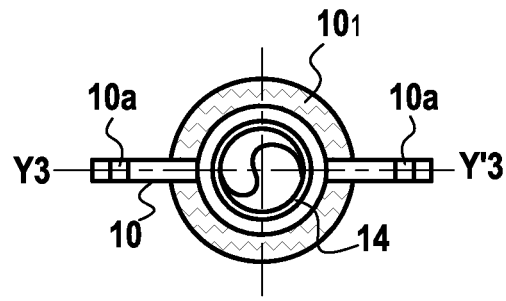
FIG. 9A is a horizontal section in plan view of the riser column of FIG. 8 showing a support having two attachment points enabling two curvature limiter devices to be attached on two respective diametrically opposite faces of a rigid pipe.
Figure 9B:
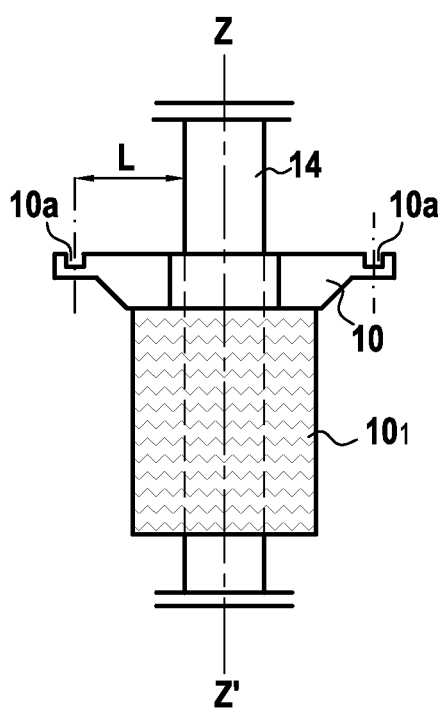
FIG. 9B is a side view corresponding to FIG. 9A showing details of the two attachment points of said support and a buoyancy element secured to the riser column.
Figure 9C:
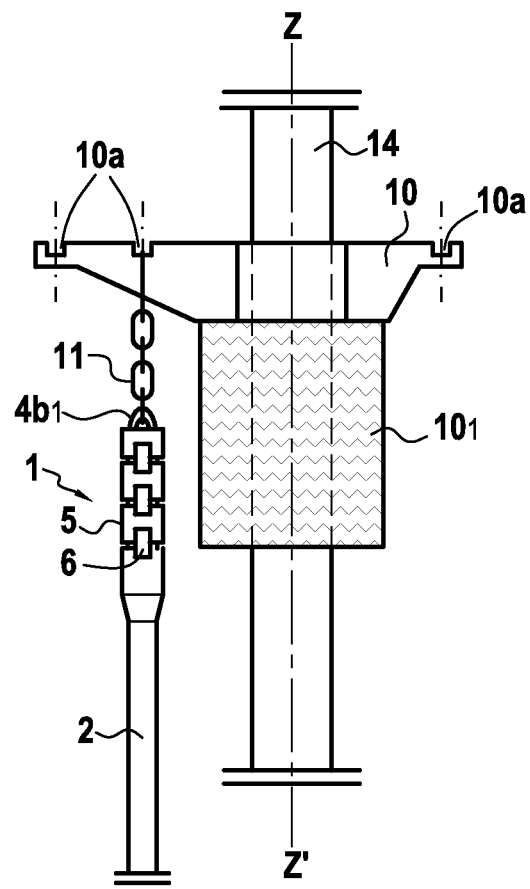
FIG. 9C shows a variant of FIG. 9B with a support having three attachment points with a curvature limiter of the device and a flexible pipe suspended from one of the three attachment points.
Figure 10A:
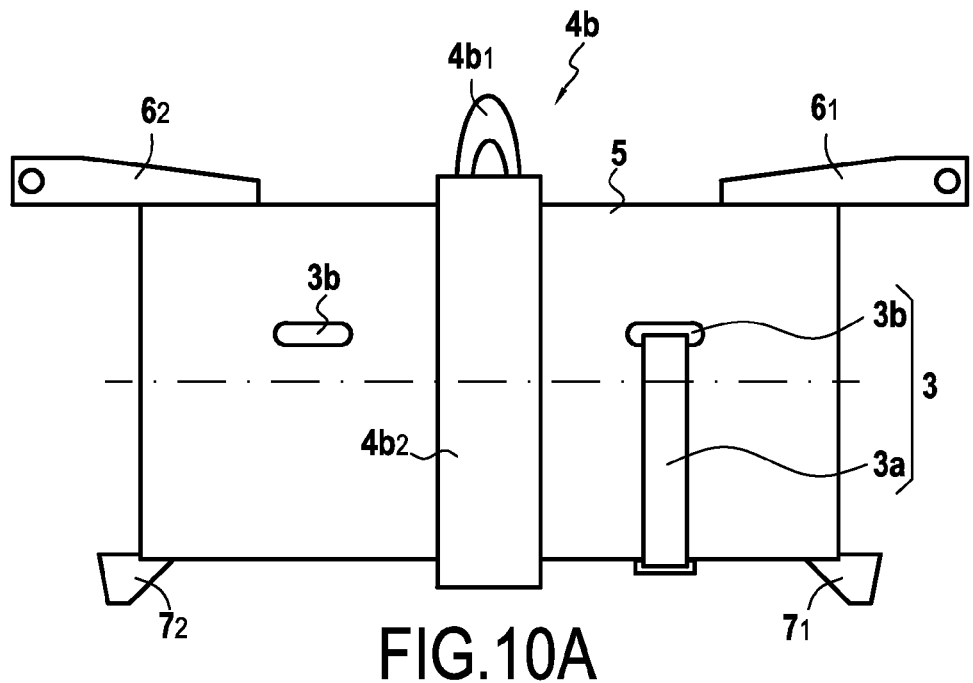
FIG. 10A is a side view of a central regular element 4b fitted with a hoist ring $4b_1$ and a single locking device 3 having a strap 3a passing through two orifices 3b of the sleeve 5 of the central element 4b.
Figure 10B:
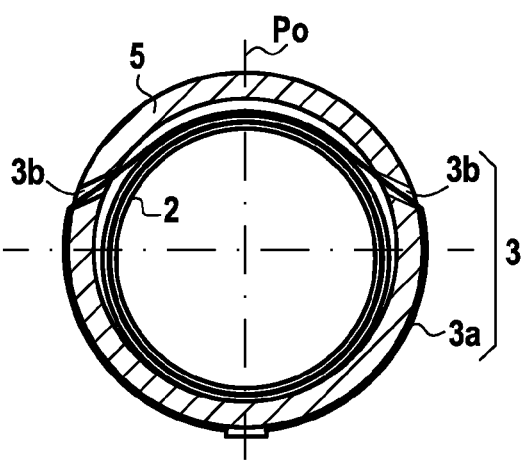
FIG. 10B is a cross-section view showing the curvature limiter at the strap 3a in its position for locking the pipe 2 inside the device 1.
Figure 10C:
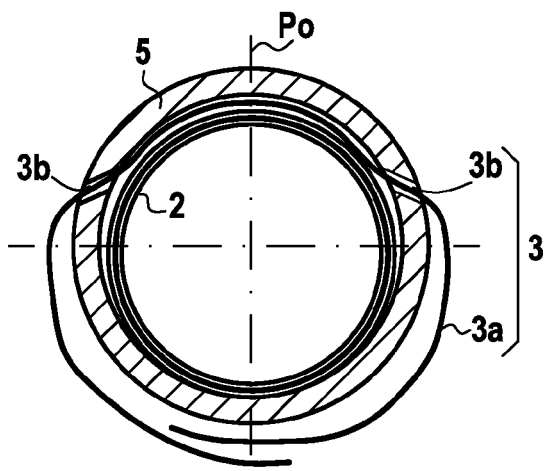
FIG. 10C is a cross-section view showing the curvature limiter at the strap 3a in its released position allowing the pipe 2 to move freely longitudinally, laterally, or in rotation about the axis XX' relative to the curvature limiter device 1.

As shown in FIG. 10A, the sleeve 5 of the central element 4b of the curvature limiter 1 is surrounded by annular peripheral central reinforcement $4b_2$ having a suspension ring $4b_1$ installed on the top face of the sleeve 5 with a short length of chain 11 attached thereto (not shown in the figure, but visible in FIG. 9C). A locking device 3 is advantageously arranged on the same central element 4b, the locking device 3 comprising a strap 3a and two openings 3b arranged symmetrically about a radial plane $P_0$ in the top portion of the sleeve 5 in such a manner that the strap 3a passes through the two openings 3b and over the top face of the flexible pipe 2 inside the sleeve 5 and under the bottom face of the sleeve 5 outside the openings 3b. Thus, when the strap 3a is tightened, the flexible pipe 2 is pressed against the inside wall of the sleeve 5 beside its bottom face so as to prevent said flexible pipe being able to slide freely along the axis XX' or in a lateral direction perpendicular to the axis XX', and also prevents it from turning about the axis XX'. Said locking device 3 is shown in its released position in FIGS. 1A, 1C, and 10C, and in its locked position in FIGS. 1B, 10A, and 10B.

Figure 7A:
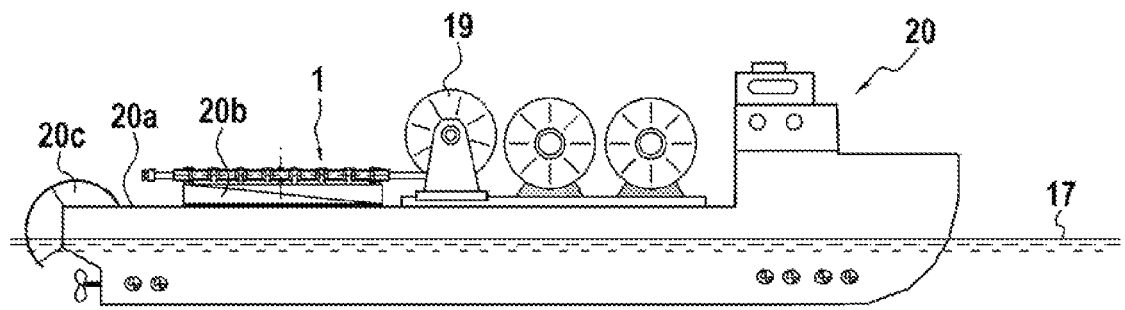
Figure 7B:
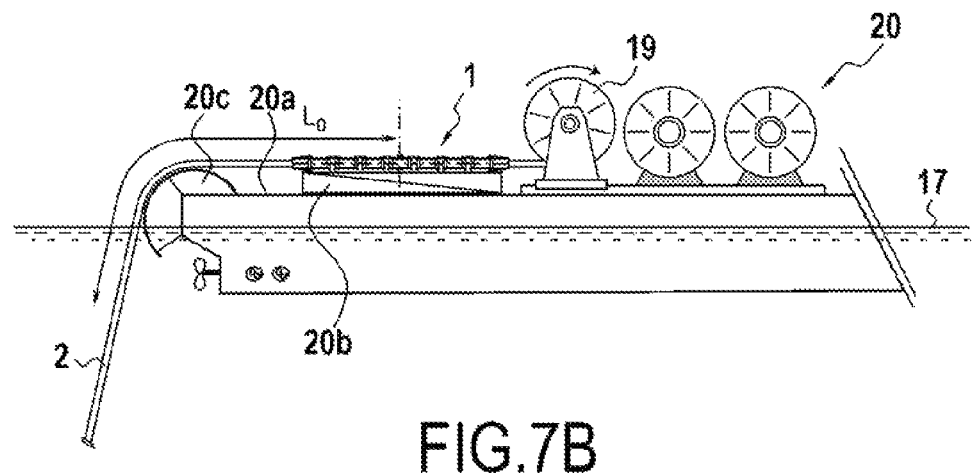
Figure 7C:
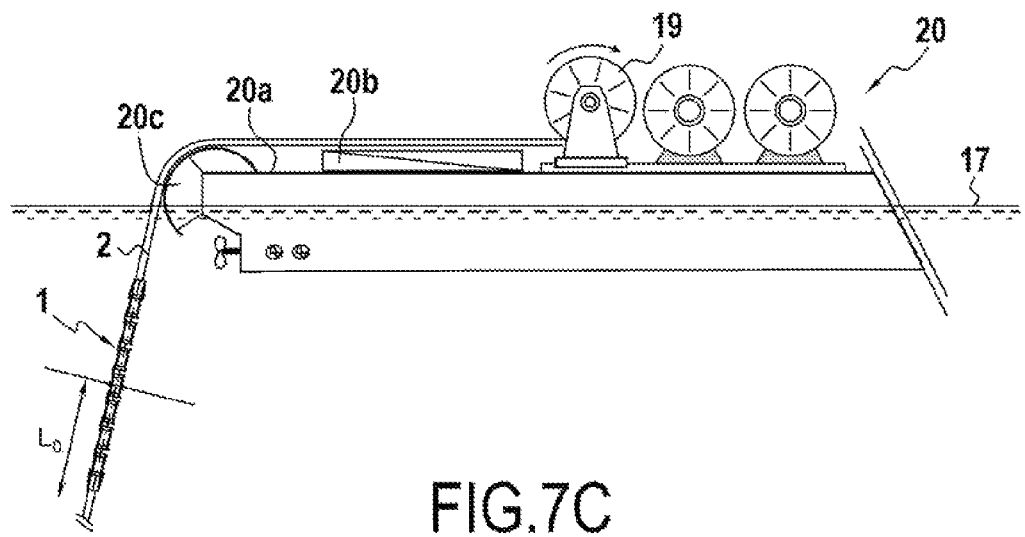

FIGS. 7A, 7B, 7C, and 8 are side views showing the main stages of installing a flexible pipe 2 fitted with a curvature limiter 1 of the invention from a laying ship 20. In FIG. 7A, the hose 2 that was previously stored by being wound on a spool 19 is unwound and the unwound end of the hose 2 fitted with the curvature limiter 1 rests horizontally on a support 20b resting on the deck 20a of the laying ship 20 in such a manner that the flexible pipe 2 is substantially tangential to the curved surface of a laying trough 20c that is generally situated at the stern of the ship 20. While the hose 2 is being stored on the spool 19, the curvature limiter 1 is in its inverted curvature position, and therefore has no curvature-limiting effect, but this does not present any problem since there is no tension in said flexible pipe 2 at this stage. Thereafter, the curvature limiter 1 is secured to its support 20b and the hose 2 begins to be laid by running the inside of the stationary curvature limiter device 1, as shown in FIG. 7B. Once a certain length $L_0$ of flexible pipe 2 has been unwound (the length $L_0$ being measured along the length of the flexible pipe 2 from its undersea end), laying is stopped, i.e. the flexible pipe 2 ceases to be unwound, the curvature limiter 1 is separated from its support 20b, and the curvature limiter 1 is locked onto the flexible pipe 2, after which laying is restarted, as shown in FIG. 7C.

Figure 8:
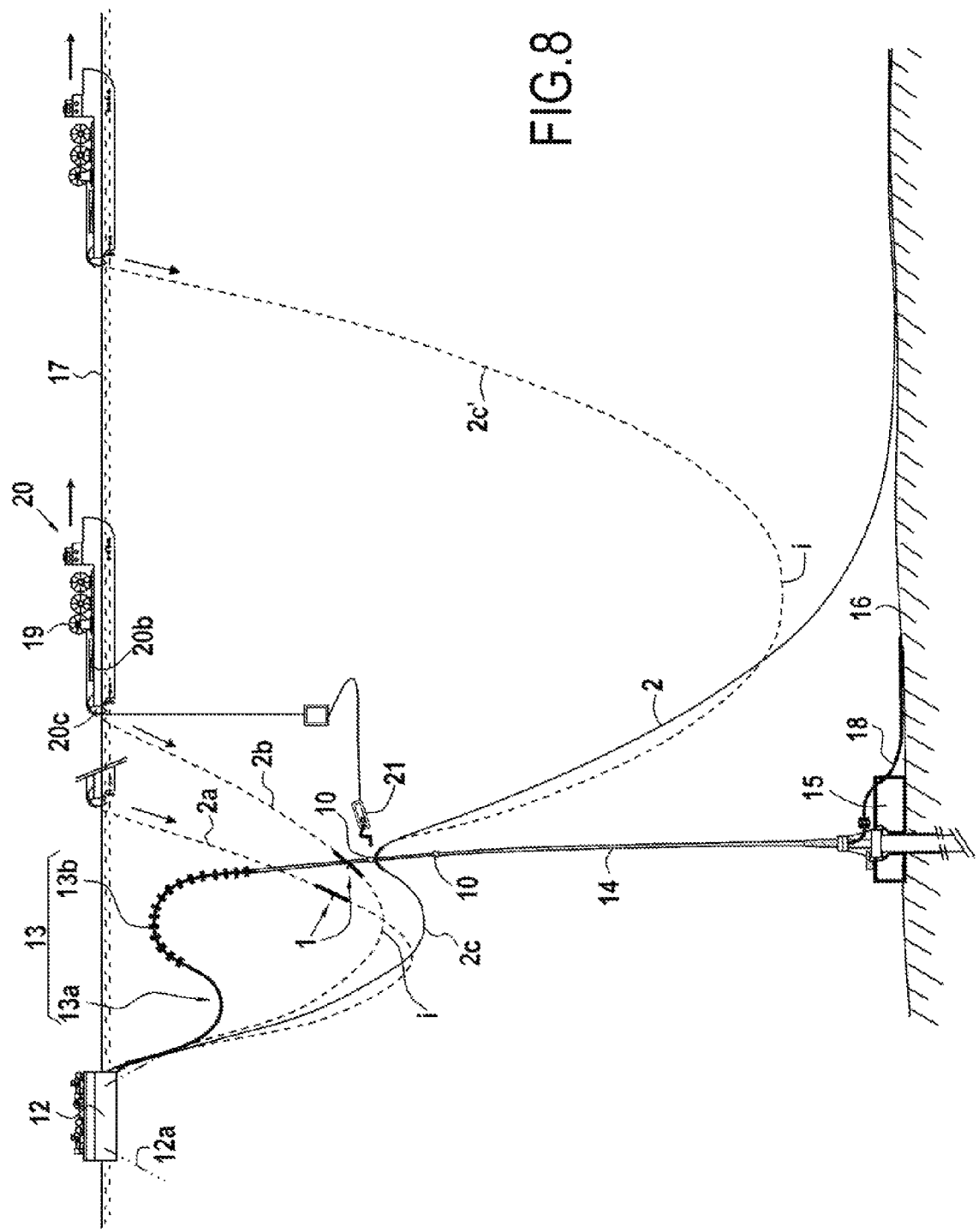
FIG. 8 shows the following stages in which the curvature limiter is positioned close to an attachment point, and is then suspended therefrom, said attachment point being secured to a riser column constituted by a rigid steel pipe.

FIG. 8 is a side view of an FPSO 12 anchored on site at 12a and including a bottom-to-surface connection such as that described in the Applicants' patent WO 2009/138609, and comprising a steel riser column 14 secured to an undersea base or equipment 15 anchored on the sea bottom 16. Its top portion is connected to a flexible pipe 2 that is connected to the FPSO, said flexible pipe 13 including a plurality of float elements 13b along a fraction of its length running from the column 14 and on a fraction of its length beside the FPSO 12 it presents the shape of a dipping catenary 13a. At approximately ⅓rd of the depth of the water, an attachment support 10 is preferably installed for the purpose of receiving the attachment device 9 of the curvature limiter 1. The attachment support 10 is shown in FIG. 9A in section on a substantially horizontal plane and in FIGS. 9B and 9C in side view.

Thus, with reference to FIG. 8, the various steps during installation are as follows:

Step 1: the flexible pipe is unwound from the laying ship 20, the end of the flexible pipe being attached to the FPSO 12 so that the undersea portion of the flexible pipe adopts a dipping catenary shape 2a, the curvature limiter then being in a slightly inverted curvature configuration.

Step 2: the curvature limiter 1 is brought towards the vertical riser 14 at an attachment support 10, the curvature limiter 1 still being in an inverted curvature configuration, with this being done with the help of an undersea remotely-operated vehicle (ROV) 21 controlled from the laying ship 20. Thereafter, the suspension chain 11 of the curvature limiter 1 is attached to the attachment support 10a, the undersea flexible pipe 2 still being in the shape of a dipping catenary 2b with its bottom point i that is tangential to the horizontal being situated in the portion of the catenary 2b that lies between the FPSO 12 and the attachment support 10, the laying ship 20 continuing to move away from the FPSO 12 on the side of the column 14 that is opposite relative to the FPSO 12.

Step 3: the ship 20 continues to move away while laying the pipe 2, the curvature of the curvature limiter 1 changing direction and then presenting its concave side facing downwards, with the radius of curvature decreasing until the limiting minimum radius of curvature $R_0$ is reached when the abutments $7_1$ and $7_2$ of the various sleeves 5 of the curvature limiter 1 comes into intimate contact. At this stage, the flexible pipe 2 has two portions in the form of dipping catenaries on either side of the curvature limiter 1, namely a first dipping catenary 2c between the FPSO 12 and the curvature limiter 1, and a second dipping catenary 2c' between the curvature limiter 1 and the laying ship 20.

Step 4: once the flexible pipe 2 is resting on the sea bottom 16, it adopts a simple catenary curve 2d and the flexible pipe 2 continues to be laid on the bottom 16 by the ship 20 moving away towards a destination well head.

The attachment support 10 shown in FIGS. 9A, 9B, and 9C is secured to the rigid riser column 14, e.g. by welding, and it extends laterally in the direction $Y_3Y_3'$ in the form of a bracket so that the attachment point constituted by a simple notch 10a is offset from the outside wall of the rigid column by a distance that is greater than the maximum outside radius "r" of the curvature limiter, and preferably greater than twice said radius "r", as shown in FIGS. 9A and 9B. Advantageously, the supporting bracket 10 extends on both sides of the rigid column 14 in the direction $Y_3Y_3'$ perpendicular to the axis $Z_3Z_3'$ of the column 14, preferably symmetrically, thereby enabling two flexible pipes 2 to be installed each fitted with a respective curvature limiter 1 of the invention on the two diametrically opposite faces of the rigid column 14.

With umbilicals or electrical cables of small diameter, e.g. of diameter lying in the range 40 mm to 75 mm, and thus of small weight per unit length, it is advantageous to have a plurality of attachment points 10a on each of the brackets so as to make it possible to install, and preferably in a manner that is substantially symmetrical in terms of vertical loads, a plurality of flexible pipes 2 at the same attachment height on the rigid column 14, as shown in FIG. 9C. A heavy flexible pipe 2 fitted with a curvature limiter 1 is suspended from the notch 10a of the bracket 10 that is closest to the column 14 on the left of the rigid column 14, a second notch 10a being situated opposite, i.e. on the right of the rigid column for the purpose of receiving a second flexible pipe, i.e. on the right of the rigid column, being ready to receive a second flexible pipe of similar characteristics, and a third notch 10a that is further from the column and on the left of said rigid column 14 is for receiving a third flexible pipe of light weight. Thus, with multiple attachment points 10a, in order to limit the bending forces in the brackets 10 and in the rigid column 14, it is preferable to install the heaviest flexible pipes closest to the rigid column, with the lightweight flexible pipes advantageously being installed further out.

Advantageously, as shown in FIG. 8, a plurality of attachment supports 10 are arranged at different depths, so as to avoid interference between the various flexible pipes installed on a given attachment support 10.

Since the weight of the flexible pipe(s) 2 suspended between the sea bottom 16 and the FPSO 12, and the weight of the curvature limiter(s) 1 is taken mainly by the attachment support 10, a buoyancy element $10_1$ is advantageously arranged at said attachment support 10 so as to compensate said weight of all of the elements either in part, in full, or where applicable in excess, i.e. the weight of the brackets 10, of the flexible pipes 2, and of the curvature limiters 1 that are suspended from the column 14.

Certain flexible pipes or umbilicals present a relatively large amount of stiffness and under their own weight the desired maximum curvature R.sub.0 corresponding to adjacent abutments $7_1$ (element N) and $7_2$ (element N+1) coming into contact, cannot be reached. In order to avoid the curvature limiter 1 being permanently deformed during movement of the FPSO 12 and of the riser column 14 under the effects of swell, wind, and sea currents, the curvature limiter 1 is advantageously constrained so that all of the adjacent abutments $7_1$-$7_2$ remain permanently in intimate contact, thereby guaranteeing a stable radius of maximum curvature that is equal to $R_0$. For this purpose, and as shown in side view and in section in FIG. 5, traction means are advantageously installed at a longitudinal end of the curvature limiter device 1 on the bottom face of the last element 4a of the curvature limiter 1. Such a device may be a winch 9a connected to a cable 9b, with the second end of the cable being connected to an attachment point 9c that is secured to the left end of the other terminal element 4a of said curvature limiter on its bottom face. Thus, throughout the stages of installing the flexible pipe 2 as described with reference to FIGS. 7, 7A, 7B, 7C, and 8, the cable 9b is left slack. When the curvature limiter 1 is in its final position, attached to the notch 10a, as shown in FIG. 9C, the ROV 21 actuates the winch 9a so as to tension the cable 9b, thereby constraining the curvature limiter 1 to become curved until the abutments $7_1$-$7_2$ of all pairs of adjacent elements 4, 4a come into intimate contact. The winch 9a possesses a latch device (not shown) that then maintains permanent tension in the cable 9b, thereby guaranteeing a constant minimum radius of curvature $R_0$ throughout the lifetime of the installation.

In a preferred version of the invention as shown in FIGS. 6A, 6B, an abutment latch device 7c is advantageously installed on the adjacent abutments $7_1$-$7_2$ of elements 4, 4a with respective numbers N and N+1, which latch device is constituted by a hook $7_1c$ hinged at $7_1d$ to the abutment $7_1$ of the element N, and a thrust spring $7_1e$ serving to hold said hook $7_1c$ in an engaged position $7_1f$. The abutment $7_2$ secured to the element N+1 presents a catch $7_2c$ for co-operating with the end of the hook $7_1c$. Thus, when the abutments $7_1$-$7_2$ of the elements N and N+1 move towards each other, the hook $7_1c$ in contact with the abutment $7_2$ moves away towards a position $7_1g$, and once the abutments $7_1$-$7_2$ are in intimate contact, said hook goes past the catch $7_2c$ and returns to its latched position $7_1f$, as shown in FIG. 6B. When all of the hooks $7_1c$ are latched, the curvature limiter 1 is then latched in its final position and the radius of curvature $R_0$ is maintained permanently.

The invention claimed is:

1. A curvature limiter device forming a tubular member suitable for adopting a rectilinear position or variable curvature while preventing a radius of curvature that is less than a given minimum radius of curvature (R0) and thus authorizing a flexible line threaded inside said tubular member to take up a controlled variable degree of curvature or no curvature, said tubular member comprising a plurality of tubular sleeves arranged end-to-end at their longitudinal ends, said sleeves being fastened to one another by fastener-and-hinge pivot devices arranged on a top face of each of said sleeves, at their longitudinal ends, said fastener-and-hinge pivot devices allowing the longitudinal axis XX', X1X1' of a first sleeve (N) to pivot relative to the longitudinal axis XX', X2X2' of a second sleeve (N+1) fastened to said first sleeve by means of said fastener-and-hinge device said pivoting taking place about a hinge axis YY', Y1Y1', Y2Y2' perpendicular to said two longitudinal axes XX', X1X1', X2X2' of said first and second sleeves, the two hinge axes YY', Y1Y1', Y2Y2' of the two fastener-and-hinge devices arranged at the two opposite longitudinal ends of each sleeve the two longitudinal ends of said sleeves each having respective abutments of complementary shape arranged against bottom faces of said sleeves in positions that are substantially diametrically opposite from said fastener-and-hinge devices, the two end faces of the two abutments at the facing longitudinal ends of said first and second sleeves (N, N+1) being spaced apart from each other when said tubular member is in a rectilinear position, and presenting a common contact surface when said two abutments are in contact with each other as a result of maximum authorized pivoting ($\alpha$) of the two bottom faces of said two sleeves towards each other by means of said fastener-and-hinge devices;

wherein said fastener-and-hinge device allows a curvature from a rectilinear position with limitation curvature of said curvature limiter device by pivoting of two sleeves to cause said bottom faces of the sleeves to approach each other, such pivoting being limited by contact between said abutments; and allows inverse curvature of said curvature limiter device from the rectilinear position by pivoting of the two sleeves by moving said top faces of the sleeves towards each other while spacing apart from each other the two said abutments; and wherein fastening the sleeves arranged end-to-end together by said fastener-and-hinge devices does not allow any longitudinal or lateral movement between the sleeves.

2. The device according to claim 1, wherein said contact surface between said abutments comprises at least one plane.

3. The device according to claim 2 wherein said contact surface is made up of two planes forming a dihedral angle with a common ridge, said ridge arranged in alignment with a straight line $D_0$ intersecting said hinge axis YY', Y1Y1', Y2Y2' of said corresponding fastener-and-hinge device.

4. The device of claim 3, wherein said ridge is arranged in alignment with a straight line Do intersecting said hinge axis YY', Y1Y1', Y2Y2' of said corresponding fastener-and-hinge device.

5. The device according to claim 1 wherein said end faces of the two abutments comprise three-dimensional surfaces of complementary shapes, respectively of concave shape and of convex shape, such that said contact surface presents a three-dimensional shape preventing any lateral movement between said first and second sleeves (N, N+1) relative to each other in a direction perpendicular to either of said longitudinal axes X1X1', X2X2' of said first and second sleeves, and having an effect of centering the longitudinal axes X1X1', X2X2' of said first and second sleeves substantially in a common longitudinal axial plane P0 when said two abutments come into contact with each other.

6. The device of claim 5, wherein said complementing shapes comprise dihedral or curved shapes.

7. The device according to claim 1, wherein said two abutments at said facing longitudinal ends of said first and second fastened-together sleeves include latch elements suitable for holding said abutments latched one against the other as soon as they come into contact with each other via a said contact surface in the event of said maximum pivoting α.

8. The device according to claim 1, wherein said fastener-and-hinge device of the first and second sleeves comprises:
a first fastener-and-hinge element comprising at least one first part defining at least one first plane face arranged in a said radial plane P0 on the top face of said first sleeve at its longitudinal end facing said second sleeve, said first part having a circular orifice in said first plane face, said orifice passing transversely at least through said first part in a direction of said hinge axis YY', Y1Y1', Y2Y2' perpendicular to said axial longitudinal directions XX', X1X1', X2X2' of the first and second sleeves; and
a second fastener-and-hinge element comprising at least one second part defining at least one second plane face arranged in a longitudinal axial plane P0 of said second sleeve on the top face of said second sleeve at its longitudinal end facing said first sleeve, said second part having a circular orifice in said second plane face, said orifice passing transversely at least through said second part in the direction of said hinge axis YY, Y1Y1', Y2Y2' perpendicular to said axial longitudinal directions XX', X1X1', X2X2' of the first and second sleeves; and
a pin passing transversely at least through said first and second parts via their said orifices.

9. The device according to claim 8, wherein:
said first fastener-and-hinge element comprises at least one said first perforated part respectively defining two facing parallel plane faces, including a first face, said two plane faces defining an empty space and being arranged apart from each other at a distance d; and
said second fastener-and-hinge element comprises at least one second flat part having two parallel opposite plane faces including at least a second face;
said second flat part of a first sleeve (N) being fastened to and interposed between the two said facing plane faces of said first fastener-and-hinge element of a second sleeve (N+1) in such a manner that the orifices of the two opposite plane faces of said second flat part are arranged facing respective orifices in the two plane faces of said first fastener-and-hinge element.

10. The device according to claim 9, wherein said fastener-and-hinge device comprises:
a first fastener-and-hinge element at the end of said first sleeve (N) having two said first perforated flat parts each having two parallel opposite plane faces, the two first flat parts being arranged side by side and parallel at said distance d apart from each other; and
a second fastener-and-hinge element at the longitudinal end of said second sleeve (N+1) having two said second perforated flat parts each having two parallel opposite plane faces, the two second flat parts being arranged side by side and parallel at said distance d apart from each other;
said first flat part of said first sleeve being interposed between said two second flat parts of the second sleeve, and said second flat part of the second sleeve being interposed between said two first flat parts of the first sleeve; and
said pin being arranged through the orifices of said two first flat parts of the first sleeve and of said two second flat parts of the second sleeve.

11. The device according to claim 1, further comprising a locking device enabling said flexible line to be locked inside said curvature limiter device, thereby preventing said flexible line and said curvature limiter device from moving relative to each other laterally and/or longitudinally, the inside diameter of said sleeve being greater than the outside diameter of said flexible line.

12. The device according to claim 11, wherein said locking device comprises at least two straps, each passing through a respective one of the two orifices in the periphery of a sleeve, the two orifices being arranged close to each other and positioned at the same level in the axial longitudinal direction XX' of said sleeve, each strap passing around at least part of said flexible line inside said sleeve and exiting at its two ends respectively via the two orifices.

13. The device according to claim 1, wherein said tubular sleeve is made up of two half-sleeves of semicircular section that are fastened to each other.

14. The device according to claim 1, further comprising a winch on said bottom face of said sleeve at one longitudinal end and a cable wound at one end on said winch, the other end of the cable being attached to an attachment element arranged at the other longitudinal end of said tubular member on its bottom face, thereby enabling said cable to be tensioned by actuating said winch to wind said cable around said winch and thus move the two longitudinal ends of said tubular member towards each other in order to create said curvature.

15. A bottom-to-surface connection installation between undersea equipment or the end of an undersea pipe resting on the sea bottom, and a support floating on the surface, the installation comprising an undersea flexible line of curvature that is controlled by said curvature limiter device according to claim 1, said flexible line being threaded inside said tubular member and said curvature limiter device being arranged at an intermediate depth between the sea bottom and the surface.

16. The installation according to claim 15, wherein said bottom-to-surface connection comprises a hybrid tower constituted by a flexible pipe extending from a said floating support on the surface to the top end of a rigid riser column or vertical riser having its bottom end connected to said undersea equipment or to said end of an undersea pipe resting on the sea bottom, said installation further comprising at least one curvature limiter device attached to said riser column.

17. A method of laying an undersea line of a bottom-to-surface connection installation between undersea equipment or the end of an undersea pipe resting on the sea bottom, and a support floating on the surface, the installation comprising an undersea flexible line of curvature that is controlled by a curvature limiter device, said curvature limiter device forming a tubular member suitable for adopting a rectilinear position or variable curvature while preventing a radius of curvature that is less than a given minimum radius of curvature (R0) and thus authorizing a flexible line threaded inside said tubular member to take up a controlled variable degree of curvature or no curvature, said tubular member comprising a plurality of tubular sleeves arranged end-to-end at their longitudinal ends, said sleeves being fastened to one another by fastener-and-hinge pivot devices arranged on the top face of each of said sleeves, at their longitudinal ends, said fastener-and-hinge pivot devices allowing the longitudinal axis XX', X1X1' of a first sleeve (N) to pivot relative to the longitudinal axis XX', X2X2' of a second sleeve (N+1) fastened to said first sleeve by means of said fastener-and-hinge device, said pivoting taking place about a hinge axis YY', Y1Y1', Y2Y2' perpendicular to said two longitudinal axes XX', X1X1', X2X2' of said first and second sleeves, the two hinge axes YY', Y1Y1', Y2Y2' of the two fastener-and-hinge devices arranged at the two opposite longitudinal ends of each sleeve being arranged at the same distance L2 from the longitudinal axis XX', X1X1', X2X2' of said sleeve, said sleeves further having, at their two longitudinal ends, respective abutments of complementary shape arranged against the bottom faces of said sleeves in positions that are substantially diametrically opposite from said fastener-and-hinge devices, the two end faces of the two abutments at the facing longitudinal ends of said first and second sleeves (N, N+1) being spaced apart from each other when said tubular member is in a rectilinear position, and presenting a common contact surface when said two abutments are in contact with each other as a result of maximum authorized pivoting ($\alpha$) of the two bottom faces of said two sleeves towards each other by means of said fastener-and-hinge devices, said flexible line being threaded inside said tubular member and said curvature limiter device being arranged at an intermediate depth between the sea bottom and the surface, the curvature limiter device arranged at an intermediate depth between the sea bottom and the surface, the method comprising the following successive steps:

(a) arranging said curvature limiter device in a rectilinear position on the deck of a laying ship and unwinding said flexible line from a spool on the deck of the ship while causing the flexible line to pass through said curvature limiter device in a fixed position on the deck of the ship;

(b) attaching the end of said flexible line to said floating support on the surface;

(c) continuing to unwind said flexible line through said curvature limiter while moving the laying ship away from said floating support so that said flexible line adopts a dipping catenary; and (d) when a given length $L_0$ of flexible pipe has been unwound by passing through said curvature limiter device in its rectilinear position, locking said curvature limiter device on said flexible line with the help of a locking device, said curvature limiter device then being entrained with said flexible line while it is being laid, the curvature limiter device being in said inverted curvature configuration with a small amount of curvature and with its concave sides facing upwards;

(e) bringing the curvature limiter device towards a vertical rigid column or suspending it from a subsurface float and continuing to unwind said flexible line in such a manner that the curvature limiter adopts a said maximum curvature R0 with its concave side facing downwards, said curvature limiter thus defining two portions of flexible line in dipping catenary shape firstly between said floating support and said curvature limiter device, and secondly between said curvature limiter device and said laying ship; and (f) continuing to lay said flexible line until the low point (i) that is tangential to the horizontal of the dipping catenary of the second portion of the flexible line between said curvature limiter device and the laying ship on the surface reaches the sea bottom and then continuing to lay said flexible line on the sea bottom while moving the laying ship away from the floating support and while unwinding said flexible line from the spool on the deck of the laying ship.

\* \* \* \* \*